United States Patent
Egawa

(10) Patent No.: US 11,924,387 B2
(45) Date of Patent: Mar. 5, 2024

(54) SHEET CONVEYING DEVICE AND IMAGE FORMING APPARATUS INCORPORATING THE SHEET CONVEYING DEVICE

(71) Applicant: Tomohiro Egawa, Kanagawa (JP)

(72) Inventor: Tomohiro Egawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 150 days.

(21) Appl. No.: 17/499,035

(22) Filed: Oct. 12, 2021

(65) Prior Publication Data
US 2022/0124212 A1    Apr. 21, 2022

(30) Foreign Application Priority Data
Oct. 16, 2020    (JP) .................... 2020-174649

(51) Int. Cl.
H04N 1/04    (2006.01)
H04N 1/00    (2006.01)

(52) U.S. Cl.
CPC ..... H04N 1/00793 (2013.01); H04N 1/00734 (2013.01)

(58) Field of Classification Search
CPC .............. H04N 1/00793; H04N 1/00734
USPC ................. 358/1.12, 488, 498, 496
See application file for complete search history.

(56) References Cited

U.S. PATENT DOCUMENTS

| | | | |
|---|---|---|---|
| 10,358,309 B2 | 7/2019 | Yamane et al. | |
| 2008/0122166 A1* | 5/2008 | Fukube | B65H 7/14 |
| | | | 271/265.01 |
| 2011/0064499 A1 | 3/2011 | Johnston et al. | |
| 2016/0159598 A1 | 6/2016 | Yamane et al. | |
| 2018/0220022 A1* | 8/2018 | Yoshikaie | H04N 1/00755 |
| 2019/0161299 A1 | 5/2019 | Egawa et al. | |
| 2019/0161301 A1 | 5/2019 | Maeyama et al. | |
| 2019/0241385 A1 | 8/2019 | Kaneko et al. | |
| 2019/0276258 A1 | 9/2019 | Egawa et al. | |
| 2019/0283998 A1 | 9/2019 | Uchida et al. | |
| 2020/0156889 A1 | 5/2020 | Egawa | |

FOREIGN PATENT DOCUMENTS

| | | |
|---|---|---|
| JP | 10-167527 | 6/1998 |
| JP | 2013-112444 | 6/2013 |
| JP | 2016-175776 | 10/2016 |
| JP | 2018-095466 A | 6/2018 |
| JP | 2019-073347 A | 5/2019 |

OTHER PUBLICATIONS

Extended European Search Report dated Feb. 25, 2022 issued in corresponding European Appln. No. 21201952.5.

* cited by examiner

*Primary Examiner* — Cheukfan Lee
(74) *Attorney, Agent, or Firm* — Harness, Dickey & Pierce, P.L.C.

(57) ABSTRACT

A sheet conveying device includes a corrector configured to correct a position of a sheet, and at least three detectors disposed in a sheet conveyance direction. Each of the at least three detectors is configured to detect a lateral end of the sheet according to a length of the sheet to be conveyed in the sheet conveyance direction. The corrector is configured to correct the position of the sheet based on detection results of each of the at least three detectors.

5 Claims, 12 Drawing Sheets

SHEET CONVEYING DEVICE AND IMAGE FORMING APPARATUS INCORPORATING THE SHEET CONVEYING DEVICE

CROSS-REFERENCE TO RELATED APPLICATION

This patent application is based on and claims priority pursuant to 35 U.S.C. § 119(a) to Japanese Patent Application No. 2020-174649, filed on Oct. 16, 2020, in the Japan Patent Office, the entire disclosure of which is hereby incorporated by reference herein.

BACKGROUND

Technical Field

Embodiments of the present disclosure relate to a sheet conveying device and an image forming apparatus incorporating the sheet conveying device.

Background Art

Sheet conveying devices are known to cause positional deviation, for example, angular displacement of a sheet such as skew of a sheet and lateral displacement of a sheet such as a lateral positional displacement or shift in the width direction of a sheet, while conveying the sheet. For example, in an image forming apparatus that forms an image on a sheet, it is inconvenient that the position of an image on the sheet shifts from an ideal position, due to positional deviation during sheet conveyance.

As a sheet conveying device that corrects such a positional deviation of a sheet, for example, a known sheet conveying device includes a pair of sheet gripping rollers that grips and conveys the sheet and corrects the position of the sheet, a first CIS and a second CIS, each being disposed upstream from the sheet gripping roller, and a third CIS disposed downstream from the sheet gripping roller in a sheet conveyance direction. After the first CIS and the second CIS detect the sheet and the pair of sheet gripping rollers corrects the position of the sheet, the second CIS and the third CIS detect the sheet and the pair of sheet gripping rollers correct the position of the sheet again. By correcting the position of the sheet again, in other words, by performing this re-correction operation, the accuracy in correction of the position of the sheet is enhanced, and the position of the sheet is corrected to the further downstream side.

SUMMARY

Embodiments of the present disclosure described herein provide a novel sheet conveying device including a corrector configured to correct a position of a sheet, and at least three detectors disposed in a sheet conveyance direction. Each of the at least three detectors is configured to detect a lateral end of the sheet according to a length of the sheet to be conveyed in the sheet conveyance direction. The corrector is configured to correct the position of the sheet based on detection results of the at least three detectors.

Further, embodiments of the present disclosure described herein provide an image forming apparatus an image forming device configured to from an image on a sheet, and the above-described sheet conveying device.

BRIEF DESCRIPTION OF THE SEVERAL VIEWS OF THE DRAWINGS

Exemplary embodiments of this disclosure will be described in detail based on the following figures; wherein.

Figure 1:
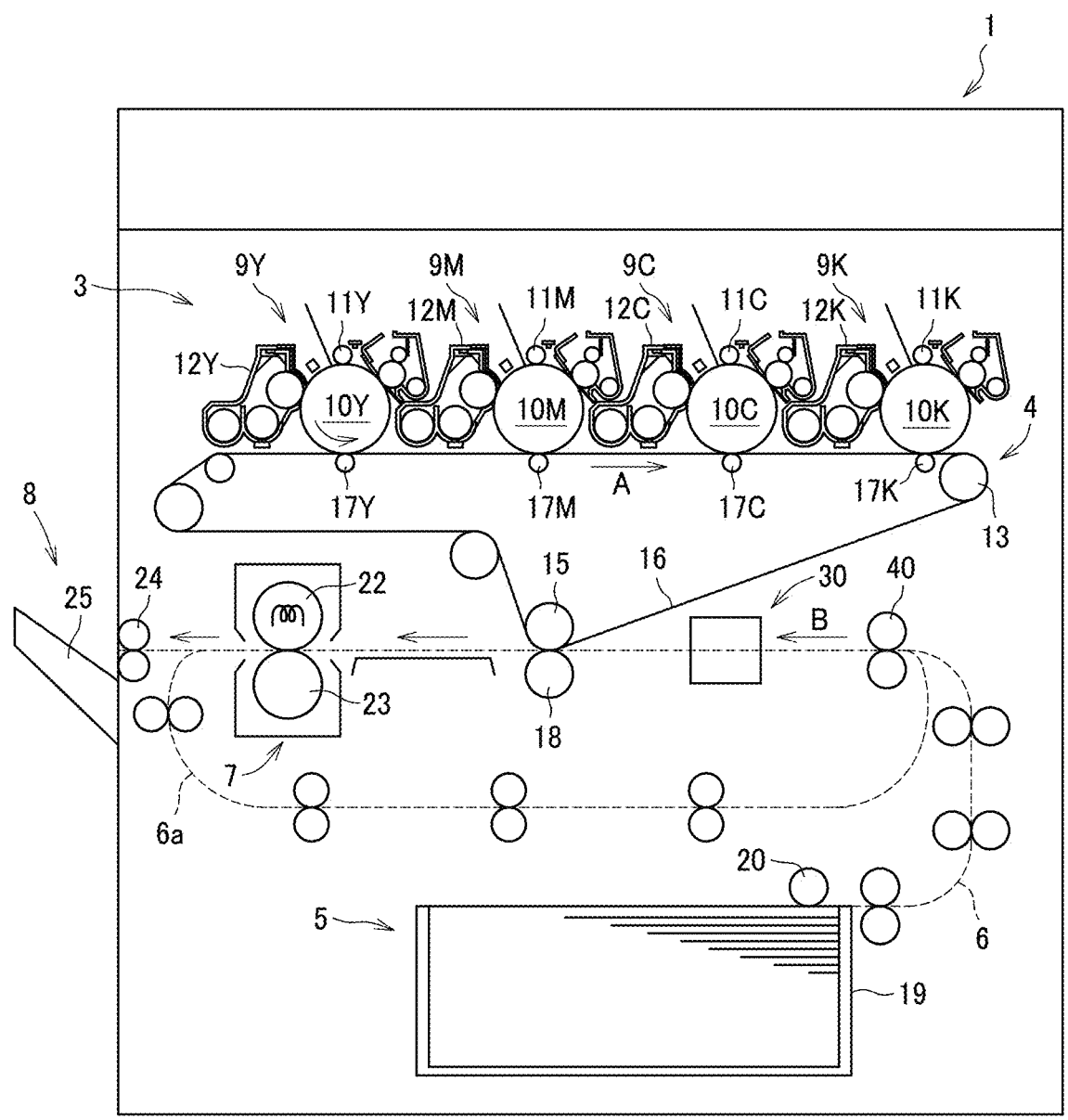
FIG. 1 is a schematic sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," When used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below in the drawings for explaining the following embodiments, the same reference codes are allocated to elements (members or components) having the same function or shape and redundant descriptions thereof are omitted below.

Next, a description is given of a configuration and functions of a sheet conveying device and an image forming apparatus, according to an embodiment of the present disclosure, with reference to drawings. Note that identical parts or equivalents are given identical reference numerals and redundant descriptions are summarized or omitted accordingly.

Descriptions are given of an embodiment applicable to a sheet conveying device according to the present disclosure and an image forming apparatus incorporating the sheet conveying device, with reference to the following figures. Note that identical parts are given identical reference numerals and redundant descriptions are summarized or omitted accordingly.

FIG. 1 is a diagram illustrating a schematic configuration of an image forming apparatus 1 according to an embodiment of the present disclosure.

As illustrated in FIG. 1, the image forming apparatus 1 is a color image forming apparatus and includes an image forming device 3 to which four process units 9Y 9M, 9C, and 9K are detachably attached. The process units 9Y 9M, 9C, and 9K have substantially the identical configurations to each other, except for colors of developers (toners). Suffixes, which are Y, M, C, and K, are used to indicate respective colors of developers (e.g., yellow, cyan, magenta, and black toners) for the process units 9Y, 9M, 9C, and 9K. Hereinafter, the process units 9Y, 9M, 9C, and 9K are occasionally referred to in a single form, for example, the process unit 9, for convenience.

Specifically, each process unit 9 (i.e., the process units 9Y, 9M, 9C, and 9K) includes a photoconductor drum 10 (i.e., photoconductor drums 10Y, 10M, 10C, and 10K in FIG. 1), a charging roller 11 (i.e., charging rollers 11Y, 11M, 11C, and 11K), a developing device 12 (i.e., developing devices 12Y, 12M, 12C, and 12K), and a cleaning device (i.e., respective cleaning devices for the process units 9Y, 9M, 9C, and 9K). The photoconductor drum 10 is a drum-shaped rotary body capable of carrying toner as a developer on the surface. The charging roller 11 uniformly charges the surface of the photoconductor drum 10. The developing device 12 supplies toner to the surface of the photoconductor drum 10.

An exposure device is disposed above the process units 9Y, 9M, 9C, and 9K. The exposure device emits a laser beam based on image data of an original document.

A transfer device 4 is disposed immediately below the image forming device 3 that includes the process units 9Y, 9M, 9C and 9K. The transfer device 4 includes a drive roller 13, a secondary transfer opposing roller 15, multiple tension rollers, an intermediate transfer belt 16, and primary transfer rollers 17Y, 17M, 17C, and 17K. The intermediate transfer belt 16 has an endless loop and is wound around the multiple tension rollers with tension, so that the intermediate transfer belt 16 moves along with rotations of the multiple tension rollers. The primary transfer roller 17 (i.e., the respective primary transfer rollers 17Y, 17M, 17C, and 17K) is disposed facing the photoconductor drum 10 (i.e., the photoconductor drums 10Y, 10M, 10C, and 10K) of the process unit 9 (i.e., the process units 9Y 9M, 9C, and 9K) between which the intermediate transfer belt 16 is interposed. At the position opposite the photoconductors 10Y 10M, 10C, and 10K, the primary transfer rollers 17Y, 17M. 17C, and 17K respectively press an inner circumferential surface of the intermediate transfer belt 16 against the corresponding photoconductors 10Y, 10M, 10C, and 10K to form a contact area. A primary transfer nip is formed in the contact area between the photoconductor drum 10 and the pressed portion of the intermediate transfer belt 16 by the primary transfer roller 17.

A secondary transfer roller 18 is disposed opposite the secondary transfer opposing roller 15 via the intermediate transfer belt 16. The secondary transfer roller 18 is pressed against an outer circumferential surface of the intermediate transfer belt 16 to form a contact area. A secondary transfer nip is formed in the contact area between the secondary transfer roller 18 and the pressed portion of the intermediate transfer belt 16.

The image forming apparatus 1 further includes a sheet feeding device 5 that is located at the lower position of the image forming apparatus 1. The sheet feeding device 5 includes a sheet feed tray 19 and a sheet feed roller 20. The sheet feed tray 19 functions as a sheet stacker that contains the sheet P as a sheet or a recording medium. The sheet feed roller 20 feeds the sheet P from the sheet feed tray 19.

The image forming apparatus 1 further includes a sheet conveyance passage 6 through which the sheet P fed from the sheet feeding device 5 is conveyed. Multiple pairs of sheet conveying rollers are appropriately disposed along the sheet conveyance passage 6 to a sheet ejection portion, which is described below.

Along the sheet conveyance passage 6, a sheet conveying device 30 is disposed downstream from the sheet feeding device 5 and upstream from the position of the secondary transfer nip region in the sheet conveyance direction. The sheet conveying device 30 corrects the positional deviation of the sheet P in the sheet conveyance passage 6 and conveys the sheet P toward the downstream side in the sheet conveyance direction.

The image forming apparatus 1 further includes a fixing device 7 that includes a fixing roller 22 and a pressure roller 23. The fixing roller 22 is heated by a heat source. The pressure roller 23 presses the fixing roller 22.

A sheet ejection device 8 is disposed at an extreme downstream side of the sheet conveyance passage 6 of the image forming apparatus 1. The sheet ejection device 8 includes a pair of sheet ejection rollers 24 and a sheet ejection tray 25. The pair of sheet ejection rollers 24 ejects the sheet P to the outside of the housing of the image forming apparatus 1. The sheet ejection tray 25 is a tray on which sheets P ejected from the housing of the image forming apparatus 1 are stacked.

Different from the sheet conveyance passage through which the sheet P is conveyed to the sheet ejection device 8, the image forming apparatus 1 includes a sheet reversal passage 6a that is branched from the sheet conveyance passage 6 at a position downstream from the fixing device 7 in the sheet conveyance direction. The downstream end of the sheet reversal passage 6a merges with the sheet conveyance passage 6 that continuously lies from the sheet feeding device 5.

Next, a description is given of the basic operations of the image forming apparatus 1, with reference to FIG. 1.

As illustrated in FIG. 1, as the image forming apparatus 1 starts a series of image forming operations, an electrostatic latent image is formed on a surface of the photoconductor drum 10 (i.e., the photoconductor drums 10Y, 10M, 10C and 10K) of the process unit 9 (i.e., the process units 9Y, 9M, 9C, and 9K). Note that image data exposed to the surface of the photoconductor drum 10 by the exposure device is single-color image data of each color separated into each color information of yellow, magenta, cyan and black based on a desired full color image. After an electrostatic latent image is formed on the surface of the photoconductor drum 10, toner stored in the developing device 12 is supplied to the surface of the photoconductor drum 10 by a drum-shaped developing roller included in the developing device 12. By so doing, the electrostatic latent image is developed into a visible toner image (image developed by developer).

In the transfer device 4, the intermediate transfer belt 16 moves along with rotation of the drive roller 13, in a direction indicated by arrow A in FIG. 1. A power source provided in the image forming apparatus 1 applies a constant voltage or a constant current control voltage having a polarity opposite to the polarity of the toner, to the primary transfer roller 17 (i.e., the primary transfer rollers 17Y, 17M, 17C, and 17K). As a result, a transfer electric field is formed in the primary transfer nip region. The toner images of respective colors on the photoconductor drums 10Y, 10M, 10C, and 10K are transferred one after another onto the surface of the intermediate transfer belt 16 by the transfer electric fields formed at the respective primary transfer nip regions. Accordingly, the image forming device 3, the exposure device, and the transfer device 4, for example, collectively function as an image forming device that forms an image on the sheet P.

By contrast, as the image forming operation starts, the sheet feed roller 20 of the sheet feeding device 5 rotates to feed the sheet P contained in the sheet feed tray 19, to the sheet conveyance passage 6, at the lower part of the image forming apparatus 1.

After being fed to the sheet conveyance passage 6, the sheet P is conveyed toward the downstream side in the sheet conveyance direction by the sheet conveying device 30 and the multiple pairs of sheet conveying rollers on the sheet conveyance passage 6 (see the sheet conveyance direction indicated by arrow B FIG. 1). While the sheet P is being conveyed in the sheet conveyance passage 6, the positional deviation of the sheet P, in other words, the lateral displacement and angular displacement of the sheet P, is corrected by the sheet conveying device 30. Thereafter, the sheet P is conveyed to the secondary transfer nip region formed between the secondary transfer roller 18 and the secondary transfer opposing roller 15. At this time, a transfer voltage having a polarity opposite to the toner polarity of the toner image formed on the surface of the intermediate transfer belt 16 is applied to the sheet P, and the transfer electric field is generated in the secondary transfer nip region. Due to the transfer electric field generated in the secondary transfer nip region, the toner image formed on the intermediate transfer belt 16 is collectively transferred onto the sheet P.

After the toner image is transferred onto the sheet P, the sheet P is conveyed to the fixing device 7. In the fixing device 7, heat and pressure are applied to the sheet P by the fixing roller 22 and the pressure roller 23, so that the toner image formed on the sheet P is fixed to the sheet P. The sheet P having the fixed toner image on the surface is separated from the fixing roller 22, is then conveyed by at least one of the multiple pairs of sheet conveying rollers disposed along the sheet conveyance passage 6 and is ejected to the sheet ejection tray 25 by the pair of sheet ejection rollers 24 in the sheet ejection device 8.

In a case in which duplex printing is performed on the sheet P, after the image forming operation on the front surface (first face) of the sheet P is completed as described above, the sheet P is conveyed to the pair of sheet ejection rollers 24. Then, at the timing at which the trailing end of the sheet P passes the pair of sheet ejection rollers 24 while the sheet P is being gripped by the pair of sheet ejection rollers 24, the pair of sheet ejection rollers 24 rotates in the reverse direction to convey the sheet P in the reverse direction to be conveyed to the sheet reversal passage 6a. Thereafter, the sheet P is conveyed on the sheet reversal passage 6a by the reversed sheet conveyance roller, so as to be conveyed to the upstream side of the sheet conveyance passage 6 from the sheet conveying device 30 again in a state in which the sheet P is reversed to be conveyed with the front face down. After the sheet conveying device 30 corrects the positional deviation of the sheet P, an image is transferred onto the back surface (second face) of the sheet P and is fixed to the sheet P. Then, the sheet P is ejected by the pair of sheet ejection rollers 24 to the sheet ejection tray 25.

This operation is the image forming operation of the image forming apparatus 1 when forming a full-color toner image on the sheet P. In addition to the above-described image forming operation, the image forming apparatus 1 is capable of forming a single color image by any one of the process units 9Y, 9M, 9C, and 9K or forming a composite color image of two or three colors by two or three of the process units 9Y, 9M, 9C, and 9K.

Figure 2A:
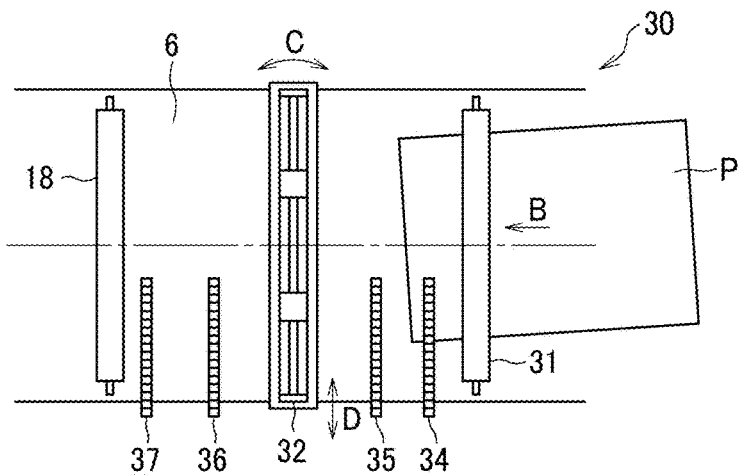
FIG. 2A is a plan view of a sheet conveying device according to the present embodiment, the sheet conveying device being included in the image forming apparatus of FIG. 1.

FIG. 2A is a plan view of a sheet conveying device according to the present embodiment, the sheet conveying device being included in the image forming apparatus of FIG. 1.

Figure 2B:
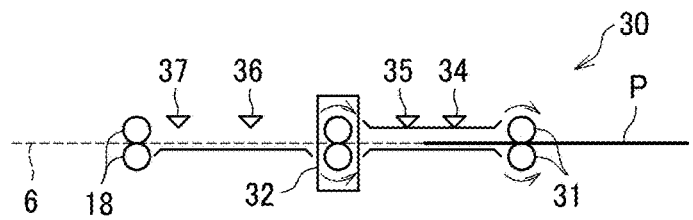
FIG. 2B is a side view of the sheet conveying device of FIG. 2A.

FIG. 2B is a side view of the sheet conveying device of FIG. 2A.

As illustrated in FIGS. 2A and 2B, the sheet conveying device 30 includes a pair of sheet conveying rollers 31 and a pair of sheet gripping rollers 32 that functions as a correction member, each conveying the sheet P. The sheet conveying device 30 further includes detectors that detect a lateral end of the sheet P. The detectors include a first CIS 34 functioning as another upstream detector, a second CIS 35 functioning as an upstream detector, a third CIS 36 functioning as a first downstream detector, and a fourth CIS 37 functioning as a second downstream detector. The secondary transfer roller 18 is disposed downstream from the pair of sheet gripping rollers 32 in the sheet conveyance direction. Hereinafter, the sheet conveyance direction B of the sheet P is simply referred to as a "sheet conveyance direction", and an upstream side of the sheet conveyance direction B and a downstream side of the sheet conveyance direction B (i.e., the left side and the right side of FIG. 2A) are also simply referred to as an "upstream side" and a "downstream side," respectively. Further, the width direction of the sheet P is also simply referred to as a "width direction."

Each set of the pair of sheet conveying rollers 31 and the pair of sheet gripping rollers 32 includes conveying members in pair that rotate together to convey the sheet P to the downstream side while gripping the sheet P in the nip region between the conveying members in pair.

The pair of sheet gripping rollers 32 is rotatable in a direction along a virtual plane of sheet conveyance of the sheet P (see bidirectional arrow C indicated in FIG. 2A) and is movable in the width direction (see bidirectional arrow D in FIG. 2A). According to these motions, the pair of sheet gripping rollers 32 rotates the sheet P or moves the sheet P in the width direction while gripping the sheet P, so as to correct the angular displacement (skew) of the sheet P or the lateral displacement (lateral positional displacement in the width direction) of the sheet P. Note that motions (movements) of the pair of sheet gripping rollers 32 are hereinafter distinguished by describing differently. That is, the rotation of the pair of sheet gripping rollers 32 to convey the sheet P is referred to as a "rotation" or a "rotation for sheet conveyance" and the rotation of the pair of sheet gripping rollers 32 in the direction indicated by arrow C to correct the angular displacement (skew) of the sheet P is referred to as a "rotation in the direction along a plane of sheet conveyance." Note that the above-described virtual plane of sheet conveyance is a surface parallel to the surface of FIG. 2A, parallel to the sheet conveyance direction of the sheet P, and orthogonal to the thickness direction of the sheet P.

As described above, the pair of sheet gripping rollers 32 functions as a corrector that corrects the position of the sheet P. Note that the position of the sheet P (sheet position) refers to the position of the sheet P in the rotational direction of the sheet P (that is, the angle of rotation of the sheet P with respect to a straight line parallel to the left-right direction in FIG. 2A, which is the sheet conveyance direction of the sheet P), the position of the sheet P in the width direction, or both. Further, the correction of the position of the sheet P (sheet position correction) refers to correcting the position of the sheet P in the rotational direction (correcting skew of the sheet P), correcting the position of the sheet P in the width direction, or both.

Each of the first CIS 34, the second CIS 35, the third CIS 36, and the fourth CIS 37 is a contact image sensor that includes multiple light emitting elements such as light emitting diodes (LEDs) and multiple light receiving elements such as photodiodes. The multiple light emitting elements and the multiple light receiving elements are aligned in the width direction of the sheet P. However, the configuration of the detectors is not limited to this configuration as long as the detectors detect the position of a lateral end of the sheet P.

The first CIS 34 and the second CIS 35 are disposed at the downstream side from the pair of sheet conveying rollers 31 and at the upstream side from the pair of sheet gripping rollers 32. Further, the third CIS 36 and the fourth CIS 37 are disposed at the downstream side front the pair of sheet gripping rollers 32 and at the upstream side from the secondary transfer roller 18 (and the secondary transfer opposing roller 15) at the secondary transfer position of the image forming apparatus 1, that is, the image transfer position as the image forming position at which an image is formed on the sheet P. In particular, the fourth CIS 37 is disposed near the secondary transfer roller 18.

Now, a detailed description is given of processes of the operation performed by the sheet conveying device 30 to correct the positional deviation of the sheet P while conveying the sheet P, with reference to FIGS. 3A through 11.

FIGS. 3A through 9B are views of a series of operations of sheet conveyance by the sheet conveying device 30.

Figure 10:
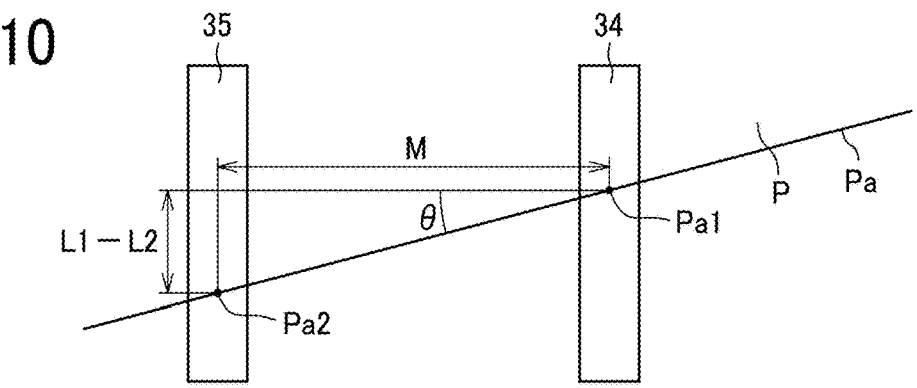
FIG. 10 is a diagram illustrating a method of calculating an angular displacement amount of the sheet.

FIG. 10 is a diagram illustrating a method of calculating an angular displacement amount of the sheet P.

Figure 11:
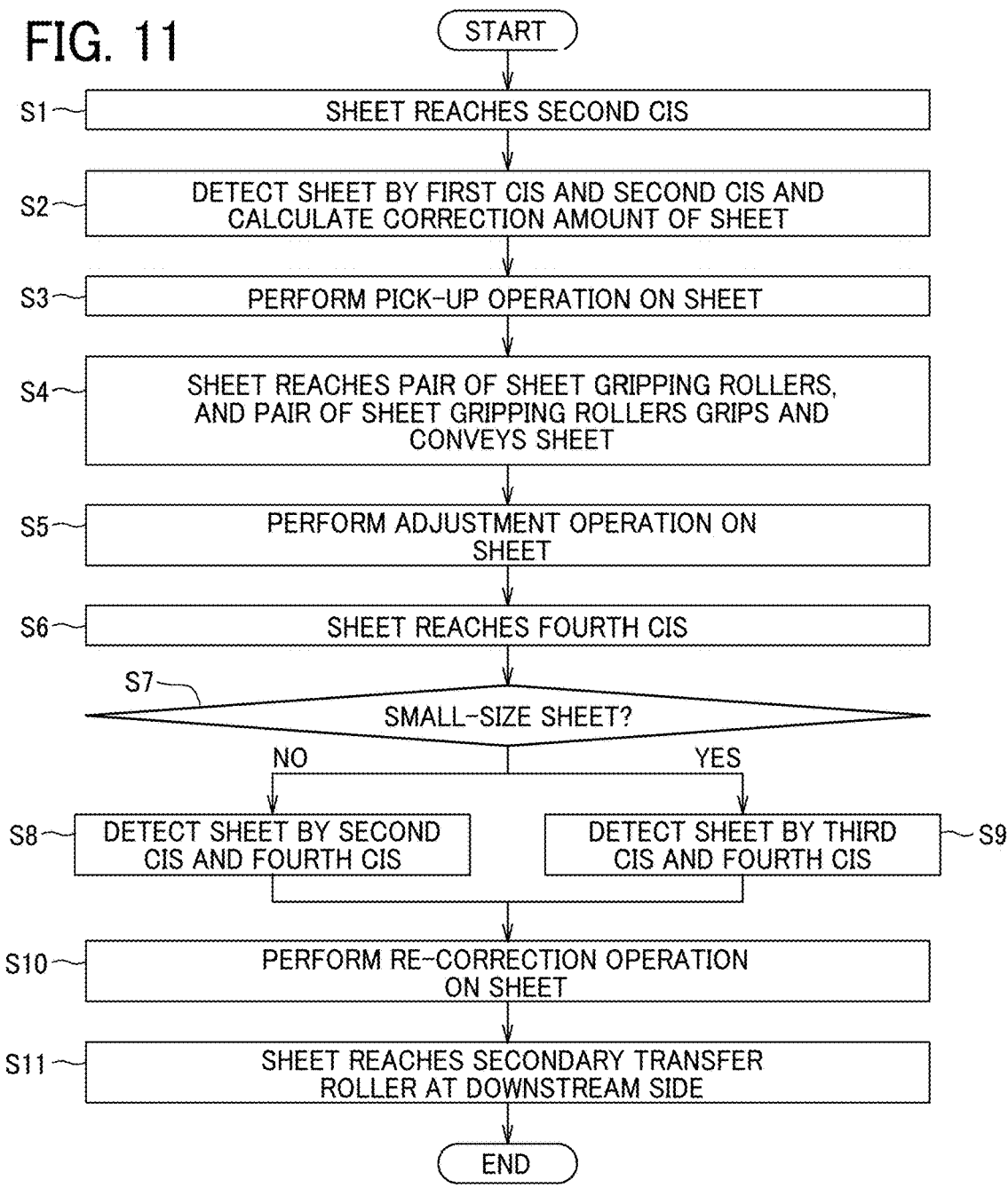
FIG. 11 is a flowchart of operations performed by the sheet conveying device.

FIG. 11 is a flowchart of operations performed by the sheet conveying device 30.

A description is now given of the operations performed by the sheet conveying device 30 when a large-size sheet is conveyed. A large-size sheet indicates a sheet having the length relatively longer than the length of a small-size sheet, which is described below. Specifically, the following description is given of the operations performed by the sheet conveying device 30 when conveying a sheet having the length in the sheet conveyance direction greater than an interval between the second CIS 35 and the fourth CIS 37.

Figure 3A:
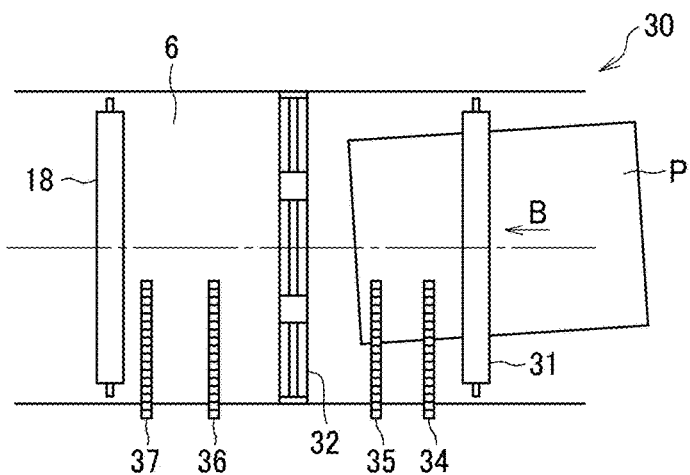
FIG. 3A is a plan view of the sheet conveying device according to the present embodiment, the sheet conveying device performing a subsequent operation from FIG. 2A.
Figure 3B:
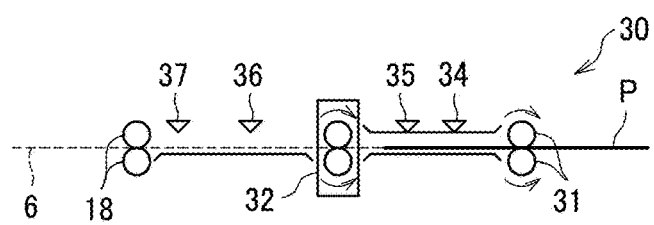
FIG. 3B is a side view of the sheet conveying device of FIG. 3A.

As illustrated in FIGS. 3A and 3B, the sheet P is conveyed by the pair of sheet conveying rollers 31 to reach the first CIS 34 and then the second CIS 35 (step S1 in the flowchart of FIG. 11). Then, the first CIS 34 and the second CIS 35 detect the position of the sheet P to obtain, by calculation, the correction amounts of positional deviation of the sheet P detected by the first CIS 34 and the second CIS 35, that is, the amount of angular displacement of the sheet P and the amount of lateral displacement of the sheet P (step S2 in the flowchart of FIG. 11).

A description is given of a specific example of a method of calculating the angular displacement amount of a sheet P and the lateral displacement amount of the sheet P, with reference to FIG. 10.

As illustrated in FIG. 10, the first CIS 34 and the second. CIS 35 detect the boundary of the sheet area and the non-sheet area of the sheet P, resulting in detection of the position of a lateral end Pa of the sheet P in the width direction. Specifically, the first CIS 34 detects a lateral position L1 of a point Pa1 and the second CIS 35 detects a lateral position L2 of a point Pa2. Then, the lateral displacement amount of the sheet P is obtained by averaging, for example, the lateral position L1 and the lateral position L2. An inclination angle (angular displacement amount) θ of the sheet P is calculated by the following equation, Equation 1, with a distance M in the sheet conveyance direction between the first CIS 34 and the second CIS 35.

$$\text{TAN } \theta = (L1-L2)/M \qquad \text{Equation 1.}$$

By using Equation 1, the angular displacement amount θ of the sheet P is obtained. Note that the lateral displacement amount of the sheet P may be detected by a single CIS at the position illustrated in FIGS. 2A and 2B, for example, or may be detected by multiple CISs.

Figure 4A:
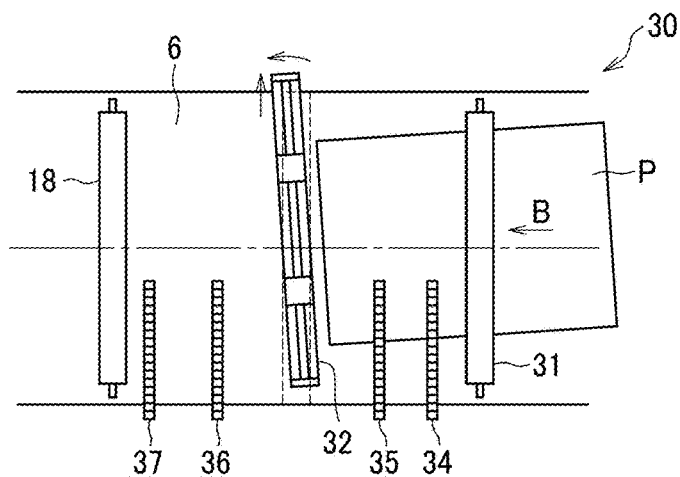
FIG. 4A is a plan view of the sheet conveying device according to the present embodiment, the sheet conveying device performing a subsequent operation from FIG. 3A.
Figure 4B:
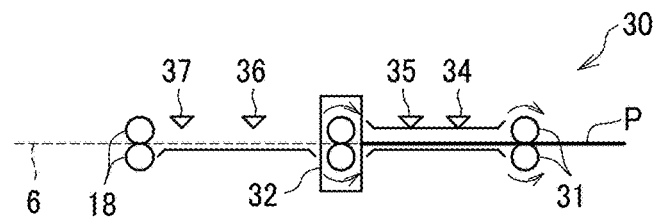
FIG. 4B is a side view of the sheet conveying device of FIG. 4A.

Then, as illustrated in FIGS. 4A and 4B, the pair of sheet gripping rollers 32 performs a pick-up operation based on the angular displacement amount of the sheet P and the lateral displacement amount of the sheet P calculated as described above (step S3 in the flowchart of FIG. 11). Each of the angular displacement amount of the sheet P and the lateral displacement amount of the sheet P is regarded as the correction amount of the corresponding displacement. In the pick-up operation, the pair of sheet gripping rollers 32 moves from the home position by the positional deviation of the sheet P, that is, by the angular displacement amount of the sheet P in the rotational direction of the sheet P and the lateral displacement amount of the sheet P in the width direction of the sheet P In other words, the pick-up operation is an operation in which the pair of sheet gripping rollers 32 moves to pick up and grip the sheet P having angular and lateral displacements while facing the sheet P normally. Further, the home position of the pair of sheet gripping rollers 32 indicates a position at which the axial direction of each roller of the pair of sheet gripping rollers 32 is orthogonal to the sheet conveyance direction of the sheet P, of the directions along a plain of sheet conveyance, as illustrated in FIG. 3A.

Figure 5A:
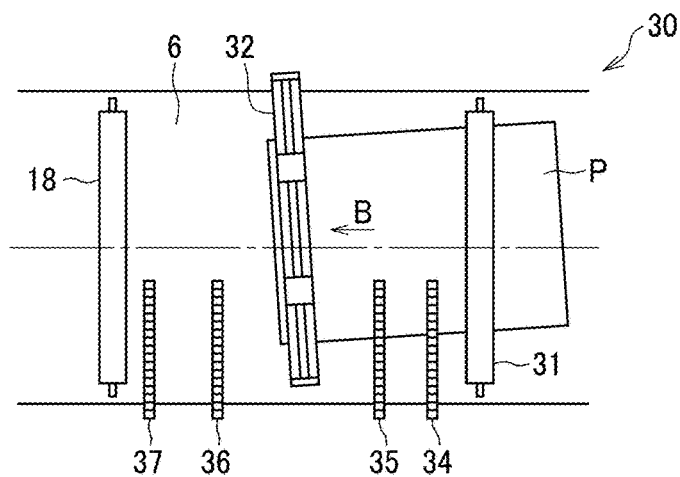
FIG. 5A is a plan view of the sheet conveying device according to the present embodiment, the sheet conveying device performing a subsequent operation from FIG. 4A.
Figure 5B:
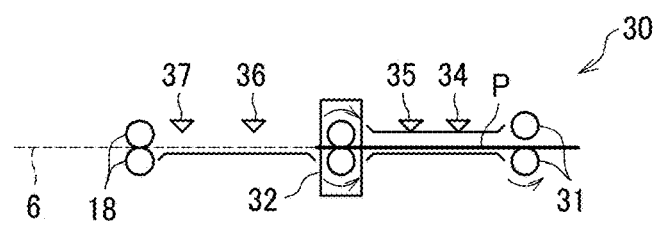
FIG. 5B is a side view of the sheet conveying device of FIG. 5A.

As illustrated in FIGS. 5A and 5B, as the sheet P reaches the pair of sheet gripping rollers 32, the sheet P is gripped by the pair of sheet gripping rollers 32 to be further conveyed to downstream side (step S4 in the flowchart of FIG. 11). Further, the rollers of the pair of sheet conveying rollers 31 disposed at the upstream side from the pair of sheet gripping rollers 32 separate from each other to release the sheet P.

Figure 6A:
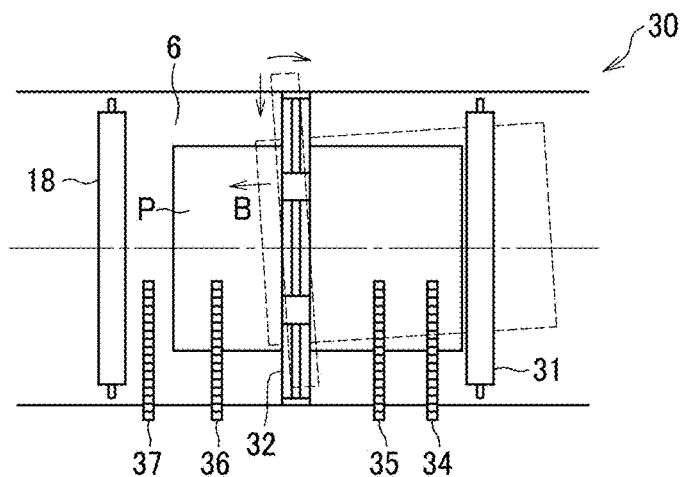
FIG. 6A is a plan view of the sheet conveying device according to the present embodiment, the sheet conveying device performing a subsequent operation from FIG. 5A.
Figure 6B:
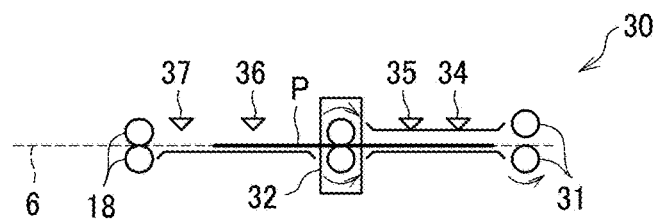
FIG. 6B is a side view of the sheet conveying device of FIG. 6A.

As illustrated in FIGS. 6A and 6B, the pair of sheet gripping rollers 32 conveys the sheet P and, at the same time, performs an adjustment operation to correct the positional deviation of the sheet P (step S5 in the flowchart of FIG. 11). In the adjustment operation, the pair of sheet gripping rollers 32 rotates in the direction along a plane of sheet conveyance and moves in the width direction of the sheet P. The adjustment operation is performed until the leading end of the sheet P reaches the fourth CIS 37 disposed at the downstream side. Note that the pair of sheet gripping rollers 32 moves to the home position in the adjustment operation.

Figure 7A:
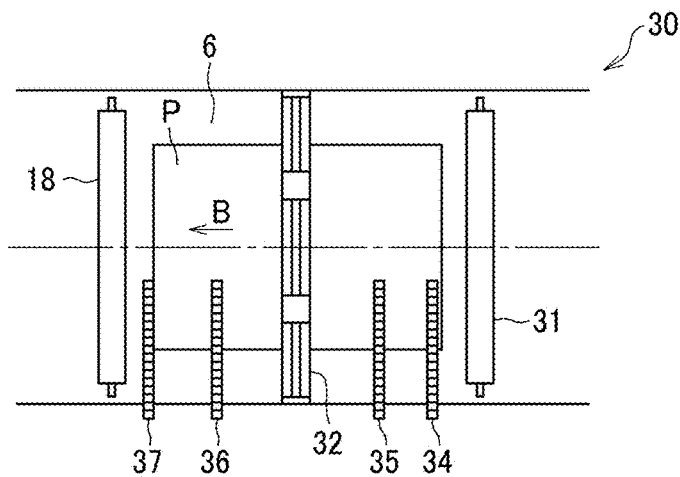
FIG. 7A is a plan view of the sheet conveying device according to the present embodiment, the sheet conveying device performing a subsequent operation from FIG. 6A.
Figure 7B:
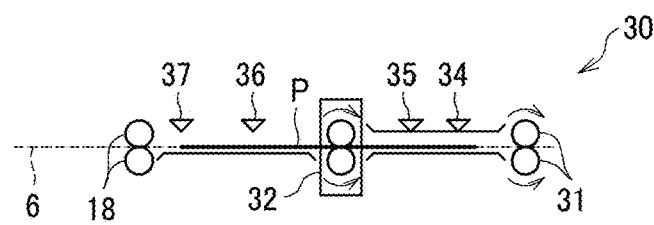
FIG. 7B is a side view of the sheet conveying device of FIG. 7A.

Then, as illustrated in FIGS. 7A and 7B, the sheet P reaches the fourth CIS 37 (step S6 in the flowchart of FIG. 11). Then, it is determined whether the sheet P is a small-size sheet (step S7 in the flowchart of FIG. 11). When the sheet P is a large-size sheet (NO in step S7), the second CIS 35 and the fourth CIS 37 detect the sheet P again to obtain, by calculation, the angular displacement amount and the lateral displacement amount of the sheet P (step S8 in the flowchart of FIG. 11). At this time, the third CIS 36 may detect the sheet P simultaneously with the second CIS 35 and the fourth CIS 37 to further enhance the detection accuracy.

Note that a method of calculating the angular and lateral displacement amounts of the sheet P based on the detection results obtained by the second CIS 35 and the fourth CIS 37 is same as the above-described method of calculating the angular and lateral displacement amounts of the sheet P based on the detection results obtained by the first CIS 34 and the second CIS 35.

Then, the pair of sheet gripping rollers 32 corrects the position of the sheet P again based on the calculated amount of positional deviation of the sheet P (step S10 in the flowchart of FIG. 11). Hereinafter, this operation is referred to as the "re-correction operation" performed on the sheet P. By performing the re-correction operation on the sheet P, the pair of sheet gripping rollers 32 corrects the positional deviation of the sheet P that is not corrected by the first correction operation (steps S2 to S5), for example, the positional deviation of the sheet P occurred after the first detection operation such as the positional deviation occurred when the pair of sheet gripping rollers 32 gripped the sheet P.

When performing the re-correction operation on the sheet P, the second CIS 35 and the fourth CIS 37 repeatedly detect the position of the sheet P moment by moment. At each detection, the feedback control is performed to feed back the detection result to reflect on the correction operation performed by the pair of sheet gripping rollers 32. By so doing, the amount of positional deviation of the sheet P is corrected with high accuracy. The above-described detection operation is performed by the second CIS 35 and the fourth CIS 37 until the trailing end of the sheet P passes the second CIS 35. However, the detection operation may be continuously performed by the third CIS 36 and the fourth CIS 37. Further, the re-correction operation completes before the sheet P reaches the rollers disposed at the downstream side.

Figure 8A:
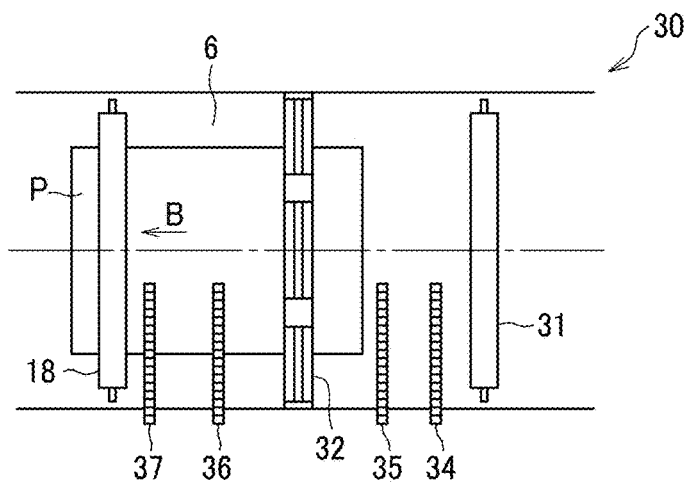
FIG. 8A is a plan view of the sheet conveying device according to the present embodiment, the sheet conveying device performing a subsequent operation from FIG. 7A.
Figure 8B:
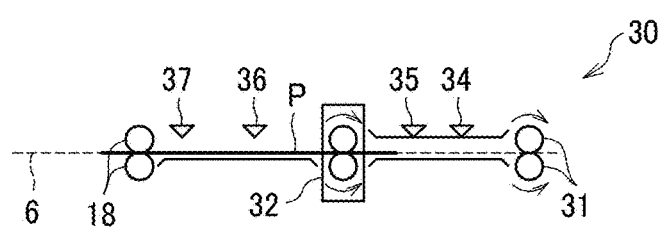
FIG. 8B is a side view of the sheet conveying device of FIG. 8A.

Then, as illustrated in FIGS. 8A and 8B, after the positional deviation of the sheet P is corrected, the sheet P reaches the secondary transfer roller 18 disposed at the downstream side (step S11 in the flowchart of FIG. 11), so that an image is transferred onto the sheet P at the position of the nip region formed between the secondary transfer roller 18 and the secondary transfer opposing roller 15, that is, the secondary transfer position of the image. As described above, the sheet conveying device 30 performs the sheet conveyance operation of the sheet P and the correction operation on the sheet P to correct the positional deviation of the sheet P during the sheet conveyance operation. Accordingly, the sheet P reaches the secondary transfer position in the state in which the positional deviation of the sheet P is corrected, and the image is transferred onto the sheet P. Further, after finishing conveyance of the sheet P, the pair of sheet gripping rollers 32 returns to the home position (see FIG. 2A) that is a position facing the sheet conveyance passage normally again, for preparing for sheet conveyance of a subsequent sheet P.

Figure 9A:
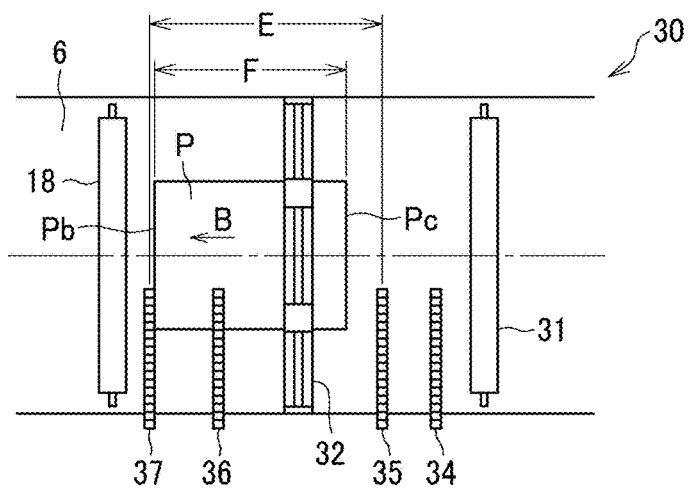
FIG. 9A is a plan view of the sheet conveying device according to the present embodiment, the sheet conveying device performing an operation when a small-size sheet passes.
Figure 9B:
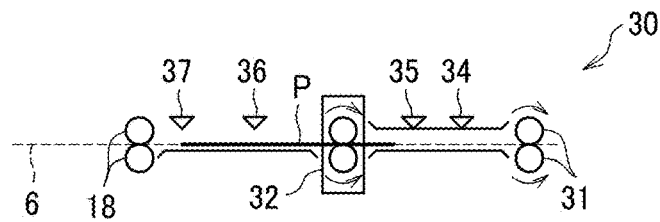
FIG. 9B is a side view of the sheet conveying device of FIG. 9A.

The image forming apparatus 1 handles various sizes of sheets. When a small-size sheet P is conveyed, as illustrated in FIGS. 9A and 9B, at the timing at which the leading end Pb of the sheet P reaches the fourth CIS 37, the trailing end Pc of the sheet P passes the second CIS 35. Due to this configuration, the second CIS 35 and the fourth CIS 37 are prevented from detecting the sheet P at the same time. In order to address this inconvenience, when such a small-size sheet P is conveyed (YES in step S7 in the flowchart of FIG. 11), the third CIS 36 and the fourth CIS 37 detect the small-size sheet P (step S9 in the flowchart of FIG. 11), and the amount of positional deviation of the small-size sheet P is calculated. Note that the small-size sheet indicates a sheet having a length F in the sheet conveyance direction smaller (shorter) than an interval E between the second CIS 35 and the fourth CIS 37. Note that, strictly, the positions of the leading and trailing ends of the sheet in the sheet conveyance direction change due to skew (angular displacement) of the sheet. Therefore, the interval E is preferably set in consideration of the length of the change+α. Accordingly, the small-size sheet of the present embodiment represents a sheet having the length in the sheet conveyance direction smaller than the interval E+α and the large-size sheet of the present embodiment represents a sheet having the length in the sheet conveyance direction equal to or greater than the interval E+α.

Then, the pair of sheet gripping rollers 32 performs the re-correction operation on the small-size sheet P, based on the calculated amount of positional deviation of the small-size sheet P (step S10 in the flowchart of FIG. 11). Similar to the large-size sheet, after the positional deviation is corrected, the small-size sheet P reaches the secondary transfer roller 18 at the downstream side, so that an image is transferred onto the small-size sheet P at the secondary transfer position (step S11 in the flowchart of FIG. 11).

As described above, in the present embodiment, correction of the position of the sheet P before secondary transfer enhances the accuracy of position of the image to be formed on the sheet P. Further, when performing duplex printing, the position of the sheet P is corrected before an image is formed on the back face (second face) of the sheet P, thereby enhancing the accuracy of position of the image to be formed on the sheet P, which is similar in the case of the large-size sheet.

Further, in the present embodiment, the third CIS 36 and the fourth CIS 37, each functioning as a detector, are disposed downstream from the pair of sheet gripping rollers 32 in the sheet conveyance direction. Due to this configuration, both in the case of handling a large-size sheet and the case of handling a small-size sheet, the pair of sheet gripping rollers 32 of the sheet conveying device 30 performs the re-correction operation on the sheet, based on the detection result of the fourth CIS 37 that is disposed at the further downstream side. In other words, in the case of handling a large-size sheet, the pair of sheet gripping rollers 32 of the sheet conveying device 30 performs the re-correction operation on the sheet, based on the detection results of the second CIS 35 and the fourth CIS 37. In the case of handling a small-size sheet that is not detected by the second CIS 35 and the fourth CIS 37 simultaneously, the third CIS 36 is used instead of the second CIS 35, and the pair of sheet gripping rollers 32 of the sheet conveying device 30 performs the re-correction operation on the sheet, based on the detection results of the third CIS 36 and the fourth CIS 37. By using the detection result of the fourth CIS 37 that is disposed at the further downstream side, the positional deviation of the sheet P is corrected in the re-correction operation, in consideration of the positional deviation of the sheet P at the further downstream side. In particular, in the present embodiment, the fourth CIS 37 disposed at the downstream side is disposed near and upstream from the secondary transfer roller 18 in the sheet conveyance direction. By so doing, the sheet conveying device 30 performs correction in consideration of the positional deviation of the sheet P up to a position immediately before the secondary transfer position. As described above, the positional deviation of a sheet is corrected with high accuracy, thereby restraining the positional deviation of an image to be transferred onto the sheet with high accuracy.

Figure 12:
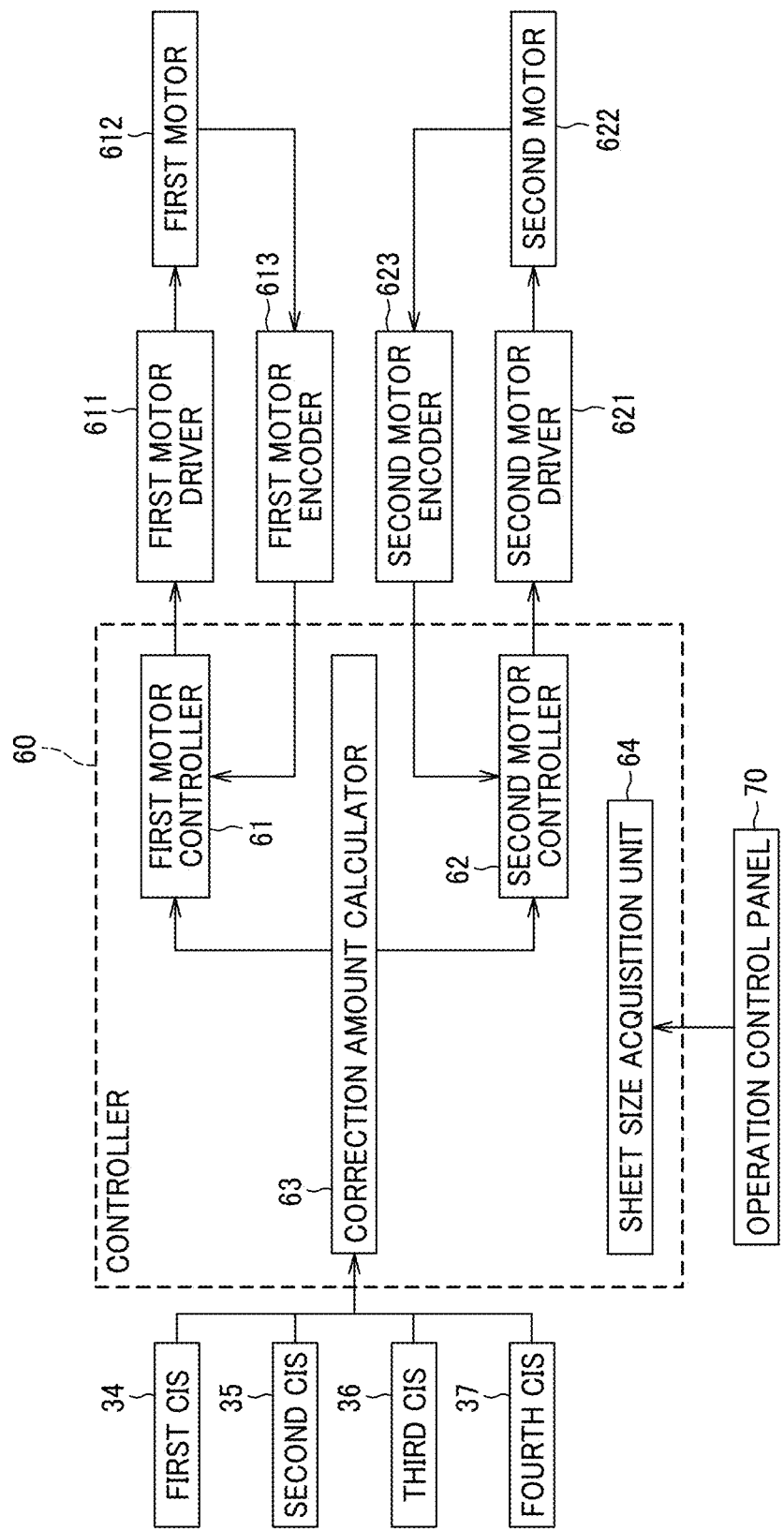
FIG. 12 is a block diagram illustrating a configuration of a controller incorporated in the sheet conveying device.

FIG. 12 is a block diagram illustrating the configuration of a controller that controls each operation of the sheet conveying device 30.

As illustrated in FIG. 12, the controller 60 includes a first motor controller 61, a second motor controller 62, a correction amount calculator 63, and a sheet size acquisition unit 64. In the present embodiment, the controller 60 is provided in the housing of the image forming apparatus 1. However, the position of the controller 60 is not limited to the housing of the image forming apparatus 1. For example, the controller 60 may be provided in the sheet conveying device 30.

An operation control panel 70 is disposed in the housing of the image forming apparatus 1, The operation control panel 70 functions as a control panel operatable by a user. The size of the sheet P to be printed, in other words, the size of the sheet P stacked in the sheet feeding device 5 (or a sheet feeding device 210 illustrated in FIG. 17) is input by a user via the operation control panel 70. The sheet size acquisition unit 64 acquires information of the size of the sheet P input by the user operating the operation control panel 70. The controller 60 determines whether the sheet size that is acquired by the sheet size acquisition unit 64 is a small size (step S7 in the flowchart of FIG. 11). Depending on the result of step S7, different CISs are used for the above-described correction. When the sheet size is not a small size (NO in step S7), the second CIS 35 and the fourth CIS 37 detect the sheet (step S8 in the flowchart of FIG. 11). When the sheet size is a small size (YES in step S7), the third CIS 36 and the fourth CIS 37 detect the sheet (step S9 in the flowchart of FIG. 11), Note that the operation control panel 70 may not be disposed on the image forming apparatus 1 but may be connected to the controller 60 via network, in acquisition of information of the sheet size, alternative to the acquisition via the operation control panel 70, the image forming apparatus 1 may include a sensor that detects the size of the sheet P stacked in the sheet feeding device 5 (or the sheet feeding device 210) and the controller 60 may acquire information of the sheet size based on the detection result of the sensor.

The first motor controller 61 and the second motor controller 62 control respective motion of the pair of sheet gripping rollers 32 based on the information of the correction amount transmitted from the correction amount calculator 63.

The first motor controller 61 controls rotation of the pair of sheet gripping rollers 32 in a direction along a plane of sheet conveyance. A first motor driver 611 drives a first motor 612 according to a signal sent from the first motor controller 61 to rotate the pair of sheet gripping rollers 32 in the direction along a plane of sheet conveyance. Then, a first motor encoder 613 detects the amount of rotations of the pair of sheet gripping rollers 32 in a direction along a plain of sheet conveyance.

The second motor controller 62 controls movement of the pair of sheet gripping rollers 32 in the width direction. A second motor driver 621 drives a second motor 622 according to a signal sent from the second motor controller 62 to move the pair of sheet gripping rollers 32 in the width direction. Then, a second motor encoder 623 detects the amount of movement of the pair of sheet gripping rollers 32 in the width direction.

The first motor 612 and the second motor 622 are driven when the pair of sheet gripping rollers 32 performs the pick-up operation (step S3 in the flowchart of FIG. 11), the adjustment operation (step S5 in the flowchart of FIG. 11), the re-correction operation (step S10 in the flowchart of FIG. 11), and the return operation to return to the home position.

The correction amount calculator 63 calculates the angular displacement amount of the sheet P and the lateral displacement amount of the sheet P, based on detection data received from each CIS. Then, the correction amount calculator 63 sends information of the positional deviation of the sheet P, in other words, the angular and lateral displacement amounts of the sheet P, to the first motor controller 61 and the second motor controller 62.

The first motor controller 61 and the second motor controller 62 drive respective motors according to the correction amount (amount of movement) input by the correction amount calculator 63 and cause the pair of sheet gripping rollers 32 to rotate in the direction along the sheet (plain of sheet conveyance) and move the pair of sheet gripping rollers 32 in the width direction of the sheet.

As described above, the controller 60 causes the pair of sheet gripping rollers 32 to move based on the detection information of each CIS, so as to correct the positional deviation of the sheet P.

Next, a detailed description is given of a configuration of the pair of sheet gripping rollers 32 that performs the above-described operations, with reference to FIGS. 13 to 16.

Figure 13:
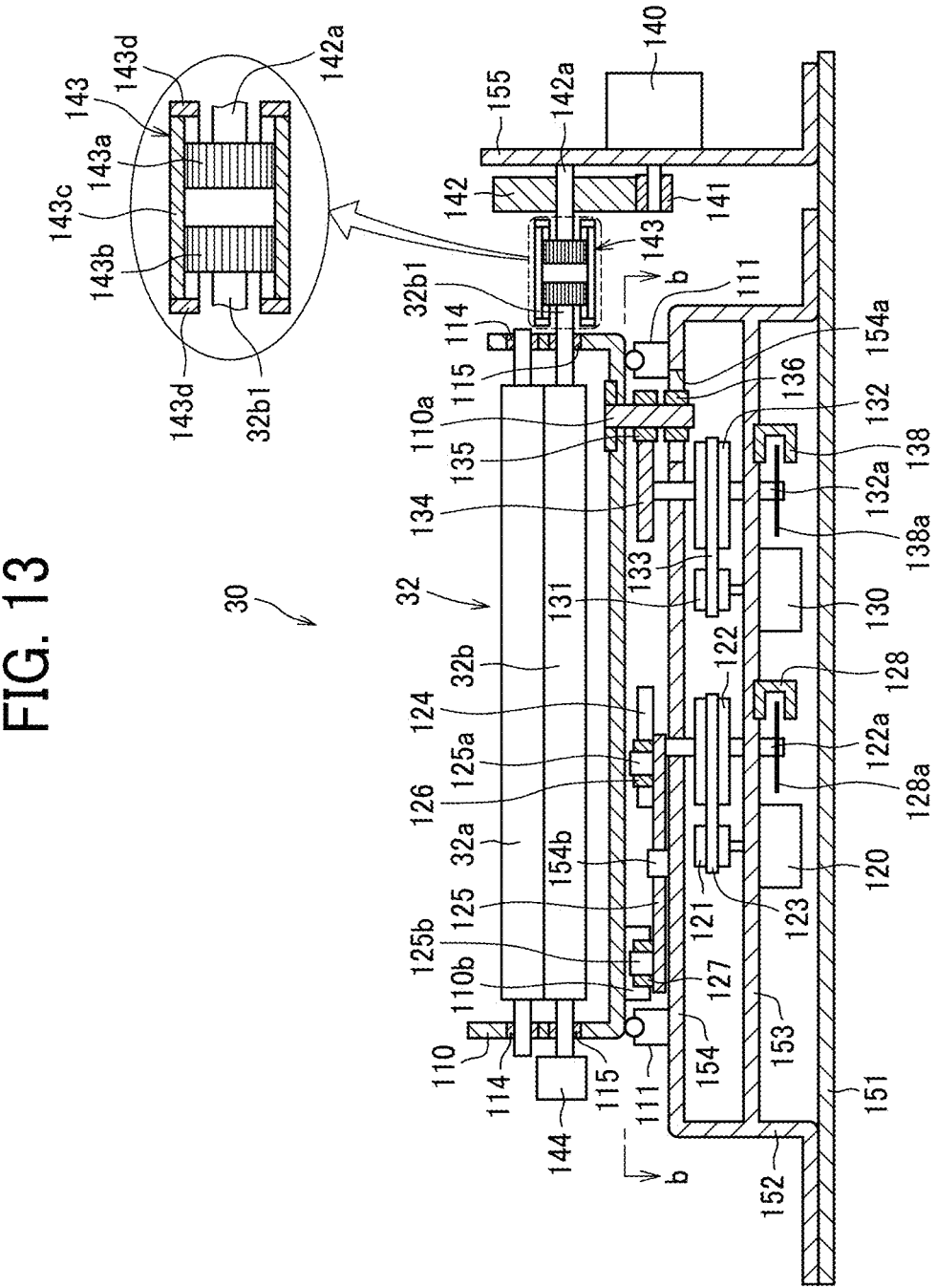
FIG. 13 is a cross sectional view of an area including a pair of sheet gripping rollers.

FIG. 13 is a cross sectional view of an area including the pair of sheet gripping rollers 32.

Specific operations performed by the pair of sheet gripping rollers 32 include an operation of rotation for conveying a sheet, an operation of rotation in the direction along the plane of sheet conveyance for correcting the positional deviation of the sheet P, and an operation of movement in the width direction.

Then, a roller moving mechanism causes the pair of sheet gripping rollers 32 to rotate in the direction along a plane of sheet conveyance and move in the width direction. As illustrated in FIG. 13, the roller moving mechanism includes a base frame 152 that is fixed to a main frame 151. The base frame 152 includes a lower horizontal plate 153 and an upper horizontal plate 154 disposed vertically. A roller holding member 110 is disposed on the upper horizontal plate 154. The roller holding member 110 is movable in the horizontal direction and supports the pair of sheet gripping rollers 32.

Figure 14:
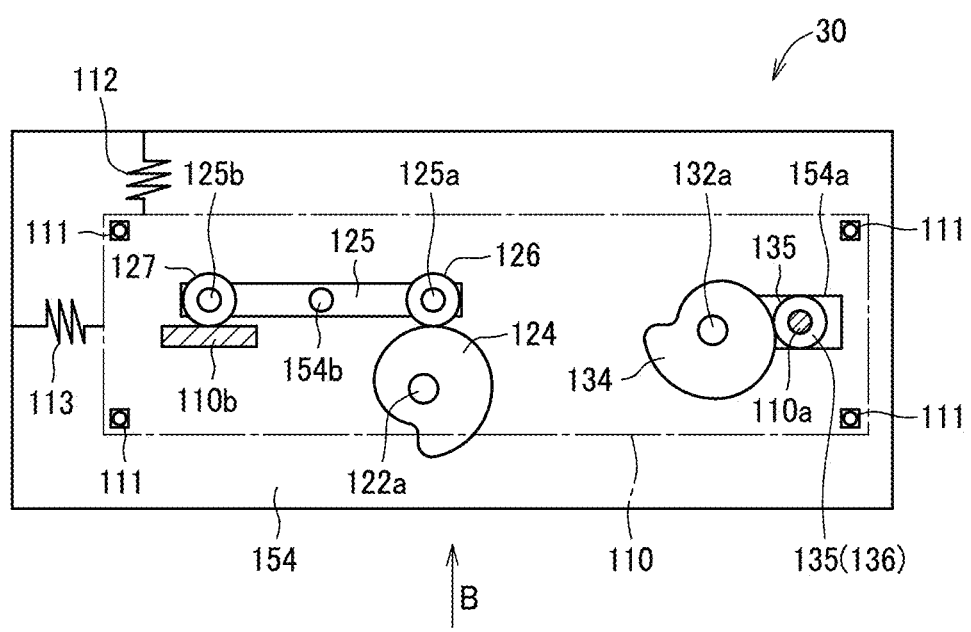
FIG. 14 is a plan view of the sheet conveying device, along a line b-b of FIG. 13.

FIG. 14 is a plan view of the sheet conveying device 30, along a line h-h of FIG. 13.

As illustrated in FIG. 14, four free hearings 111 (ball transfers) are disposed at respective positions of four corners on a base surface of the roller holding member 110, on the upper horizontal plate 154. The roller holding member 110 is disposed on the free bearings 111 to be movable horizontally in any directions, which are front, back, left, and right directions. Note that arrow "B" in FIG. 14 indicates the sheet conveyance direction.

Each of the free bearings 111 is known to include a steel ball fitted into a recess of the base surface of the roller holding member 110. The top end of the steel ball contacts the base surface of the roller holding member 110 as a point contact. The free bearings 111 are provided at least three bearings. In the present embodiment, the four free bearings 111 are provided so that the roller holding member 110 moves stably and reliably.

As illustrated in FIG. 13, the roller holding member 110 includes a plate frame extending in a direction perpendicular to the sheet conveyance direction of the sheet P. Both ends of the plate frame of the roller holding member 110 are upwardly bent at a right angle. An upper bearing 114 and a lower bearing 115 are vertically fixed to respective bent portions of both ends of the roller holding member 110. The roller holding member 110 further includes a rotation receiver 110b on one side on a lower face of the roller holding member 110. The rotation receiver 110b extends by a predetermined length in a direction perpendicular to the sheet conveyance direction of the sheet P and projects vertically and downwardly from the lower face of the roller holding member 110, as a single unit.

The pair of sheet gripping rollers 32 includes a drive roller 32b disposed on the lower side and a driven roller 32a disposed on the upper side. A rotary shaft of the driven roller 32a on the upper side of the pair of sheet gripping rollers 32 is supported by the upper bearing 114 of the roller holding member 110 and a rotary shaft of the drive roller 32b on the lower side of the pair of sheet gripping rollers 32 is supported by the lower bearing 115 of the roller holding member 110.

A rotary encoder 144 is mounted on the rotary shaft of the drive roller 32b. The rotary shaft of the drive roller 32b is outwardly projected from the lower bearing 115. The rotary encoder 144 detects the number of rotations of the drive roller 32b, and a rotation variable roller drive motor 140 is driven based on the number of rotations of the drive roller 32b detected by the rotary encoder 144. Then, the driven roller 32a is rotated along with rotation of the drive roller 32b. The rotation variable roller drive motor 140 is described below.

The roller holding member 110 further includes a support shaft 110a fixed on the opposite side on the lower face. The support shaft 110a functions as a guide target portion that projects downwardly, in a relatively short distance, from the lower face of the roller holding member 110. A guide roller 136 is rotatably disposed on the lower end of the support shall 110a. A cam follower 135 is rotatably disposed in the middle or at the axial center of the support shaft 110a.

A first motor 120, a second motor 130, and rotary encoders 128 and 138 are aligned on the lower horizontal plate 153 in the horizontal direction (i.e., the left and right directions). The first motor 120 is used to correct the angular displacement of the sheet, and a drive pulley 121 is fixedly attached to the rotary shaft of the first motor 120. The second motor 130 is used to correct the lateral displacement of the sheet, and another drive pulley 131 is fixedly attached to the rotary shaft of the second motor 130.

Note that, instead of the rotary encoder 128, any encoder (for example, a linear encoder) or any sensor (for example, a laser displacement sensor) may be included in the sheet conveying device 30 to detect the motion and position of each of a first rotation cam 124 and a lever 125. Details of the first rotation cam 124 and the lever 125 are described below. Further, note that, instead of the rotary encoder 138, any encoder (for example, a linear encoder) and any sensor (for example, a laser displacement sensor) may be included in the sheet conveying device 30 to detect the motion and position of each of a shift cam 134 and the roller holding member 110. Details of the shift cam 134 are described below.

Driven pulleys 122 and 132 are rotatably supported between the lower horizontal plate 153 and the upper horizontal plate 154. Both upper and lower ends of a rotary shaft 122a of the driven pulley 122 are rotatably supported by the lower horizontal plate 153 and the upper horizontal plate 154. Similarly, both upper and lower ends of a rotary shaft 132a of the driven pulley 132 are rotatably supported by the lower horizontal plate 153 and the upper horizontal plate 154. The rotary shaft 122a and the rotary shaft 132a are disposed in parallel to each other. A timing belt 123 is wound around the drive pulley 121 and the driven pulley 122. A timing belt 133 is wound around the drive pulley 131 and the driven pulley 132.

The rotary shaft 122a of the driven pulley 122 is projected downwardly form the lower horizontal plate 153. A rotary plate 128a that functions as a rotary side part of the rotary encoder 128 is fixed to the rotary shaft 122a of the driven pulley 122. Similarly, the rotary shaft 132a of the driven pulley 132 is projected downwardly form the lower horizontal plate 153. A rotary plate 138a that functions as a rotary side part of the rotary encoder 138 is fixed to the rotary shaft 132a of the driven pulley 132. Multiple slits are sequentially formed on the peripheral end of the rotary plate 128a of the rotary encoder 128 and on a peripheral end of the rotary plate 138a of the rotary encoder 138. The rotary encoder 128 includes a light emitting element and a light receiving element, each functioning as a side part of the rotary encoder 128 and being disposed to vertically hold the peripheral end of the rotary plate 128a. Similarly, the rotary encoder 138 includes a light emitting element and a light receiving element, each functioning as a side part of the rotary encoder 138 and being disposed to vertically hold the peripheral end of the rotary plate 138a.

The rotary shaft 122a of the driven pulley 122 is also projected upwardly form the upper horizontal plate 154. The first rotation cam 124 is fixed to the rotary shaft 122a of the driven pulley 122. Similarly, the rotary shaft 132a of the driven pulley 132 is also projected upwardly form the upper horizontal plate 154, The shift cam 134 is fixed to the rotary shaft 132a of the driven pulley 132. The cam curve of the first rotation cam 124 and the cam curve of the shift cam 134 are manufactured to generate respective motion curves having a constant velocity. By employing the cam having a constant velocity, the angle of rotation of the first rotation cam 124 is controlled to have an amount of change in proportion to the distance of linear motion of a cam follower 126, and the angle of rotation of the shift cam 134 is controlled to have an amount of change in proportion to the distance of linear motion of the cam follower 135. Therefore, the shift position of the support shaft 110a and the rotation of the lever 125 are controlled easily.

A slot 154a that functions as a guide is disposed extending in a direction perpendicular to the sheet conveyance direction, on one side of the upper horizontal plate 154, at a position adjacent to the shift cam 134. The guide roller 136 disposed on the lower end of the support shaft 110a is inserted into the slot 154a. As illustrated in FIG. 14, the cam follower 135 disposed in the middle portion of the support shaft 110a contacts a cam face of the peripheral end of the shift cam 134 by a force applied by a second tension spring 113. The slot 154a is used to guide the guide roller 136 linearly, and therefore may be replaced by a long groove.

A support shaft 154b is disposed projecting from the upper horizontal plate 154, on the opposite side of the shift cam 134. The lever 125 is mounted on the support shaft 154b to be rotatable in the horizontal direction. Support shafts 125a and 125b are integrally formed on both ends of the lever 125. The cam follower 126 and a roller 127 that functions as a first pressing portion are rotatably disposed on the support shafts 125a and 125b via bearings such as ball bearings. An outer circumferential surface of the cam follower 126 contacts an outer circumferential surface of the first rotation cam 124 by a spring force applied by a first tension spring 112, An outer circumferential surface of the roller 127 contacts the rotation receiver 110b by the spring force applied by the first tension spring 112.

Specifically, as illustrated in FIG. 13, the first motor 120, the drive pulley 121, the timing belt 123, the driven pulley 122, the first rotation cam 124, the lever 125, and the roller 127 are used to perform correction of angular displacement of a sheet and form a first drive portion. The first drive portion has a configuration in which the roller 127 that functions as a first pressing portion moves in front and back in the sheet conveyance passage (i.e., the sheet conveyance direction) of the sheet P.

In addition, the second motor 130, the drive pulley 131, the timing belt 133, the driven pulley 132, and the shift cam 134 are used to perform correction of positional deviation of a sheet in the width direction and form a second drive portion. The second drive portion further includes a second pressing portion (i.e., an outer circumferential surface of the shift cam 134) to contact the support shaft 110a that functions as a guide target portion, via the cam follower 135. The second pressing portion has a configuration in which the support shaft 110a moves in left and right in the direction perpendicular to the sheet conveyance passage (i.e., the sheet conveyance direction) of the sheet P.

A bracket 155 is disposed vertically on the main frame 151, at one axial end of the pair of sheet gripping rollers 32. The bracket 155 has an outer surface on which the rotation variable roller drive motor 140 is fixedly disposed to rotate the drive roller 32b of the pair of sheet gripping rollers 32. A rotary shaft of the rotation variable roller drive motor 140 projects horizontally toward the inside of the bracket 155. A pinion gear 141 is fixedly disposed to the rotary shaft that projects toward the inside of the bracket 155. The pinion gear 141 is meshed with a reduction gear 142 that is supported at the inside of the bracket 155.

A rotary shaft 142a of the reduction gear 142 is coupled to a rotary shaft 32b1 of the drive roller 32b of the pair of sheet gripping rollers 32 via a two-step spline coupling 143. According to this configuration, a rotation driving force applied by the rotation variable roller drive motor 140 is transmitted to the drive roller 32b of the pair of sheet gripping rollers 32 via the pinion gear 141, the reduction gear 142, and the two-step spline coupling 143. Accordingly, the pair of sheet gripping rollers 32 is rotated. Accordingly, as the drive roller 32b of the pair of sheet gripping rollers 32 is rotated by the rotation variable roller drive motor 140 while the pair of sheet gripping rollers 32 is gripping the sheet P, the sheet P is conveyed at any conveying speed.

The two-step spline coupling 143 is a type of a constant velocity universal joint and, as illustrated in an enlarged area in FIG. 13, includes a first spline gear 143a, a second spline gear 143b, an intermediate spline gear 143c, and guide rings 143d.

The first spline gear 143a is an external gear and is mounted on the rotary shaft 142a that rotates together with the reduction gear 142 of the first drive portion. The rotary shaft 142a is rotatably held by the bracket 155 via a bearing.

The second spline gear 143b is an external gear and is coupled with the rotary shaft 32b1 of the drive roller 32b of the pair of sheet gripping rollers 32. The intermediate spline gear 143c is an internal gear and is extended in the width direction so that the intermediate spline gear 143c constantly meshes with the two spline gears, which are the first spline gear 143a and the second spline gear 143b, even when the pair of sheet gripping rollers 32 (attached to the roller holding member 110) shifts (slides) in the width direction. Each of the two spline gears, which are the first spline gear 143a and the second spline gear 143b, has a crown shape so that the first spline gear 143a and the second spline gear 143h mesh with the intermediate spline gear 143c even when the pair of sheet gripping rollers 32 (attached to the roller holding member 110) rotates in a direction of rotation of the sheet P, in other words, in an oblique direction with respect to the sheet conveyance direction.

By employing the two-step spline coupling 143 as described above, the pair of sheet gripping rollers 32 is rotated reliably. Specifically, even when the pair of sheet gripping rollers 32 rotates in the substantially horizontal direction about the support shaft 110a or shifts (slides) in the width direction of the sheet P, the driving force of the rotation variable roller drive motor 140 disposed on the fixed side of the pair of sheet gripping rollers 32 is transmitted to the drive roller 32b of the pair of sheet gripping rollers 32 reliably with accuracy.

Note that each of the guide rings 143d is a stopper having a substantially ring shape. The guide rings 143d are mounted at both ends of the intermediate spline gear 143c in the width direction, so as to prevent the two spline gears, which are the first spline gear 143a and the second spline gear 143b, from moving relatively in the width direction and from falling from the two-step spline coupling 143.

FIGS. 15A, 15B, 15C, and 15D are diagrams, each illustrating the pair of sheet gripping rollers 32 attached to the roller holding member 100 moving in the width direction and rotating along a plain of sheet conveyance of the sheet P when correcting the positional deviation of the pair of sheet gripping rollers 32.

Figure 15A:
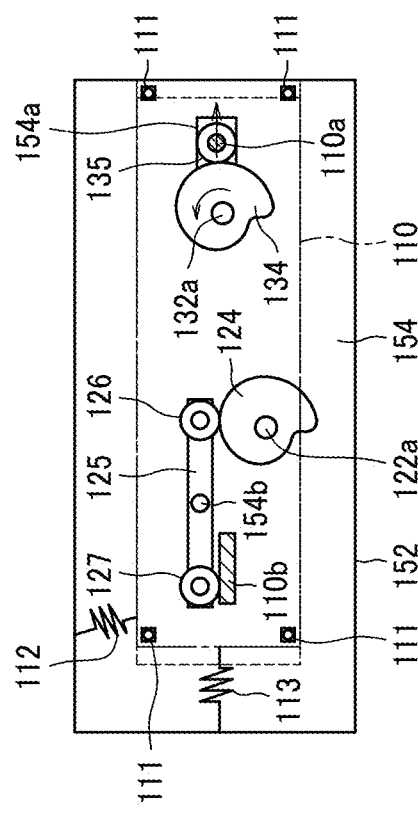
FIGS. 15A, 15B, 15C, and 15D are diagrams, each illustrating a roller holding member moving in the width direction and rotating in a direction along a plane of sheet conveyance of the sheet.
Figure 15B:
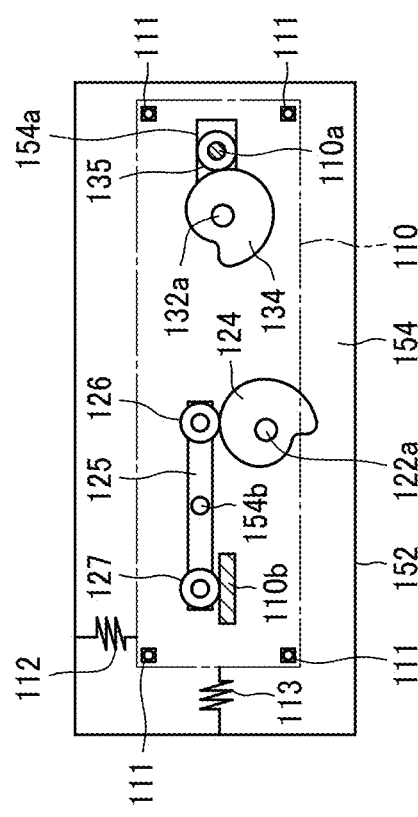
Figure 15C:
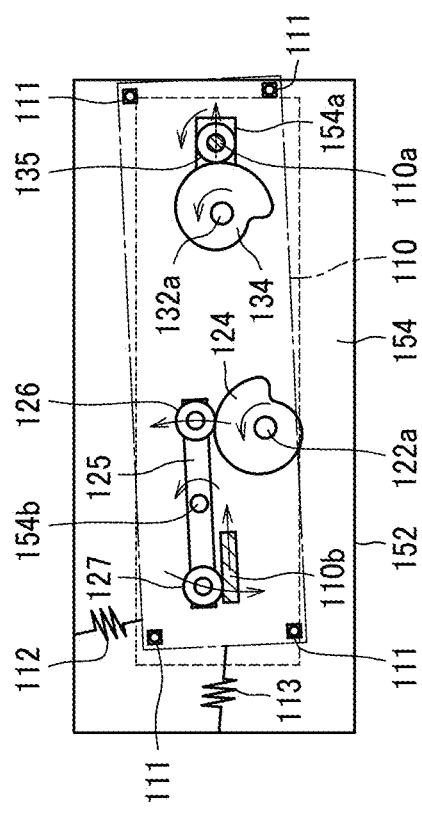
Figure 15D:
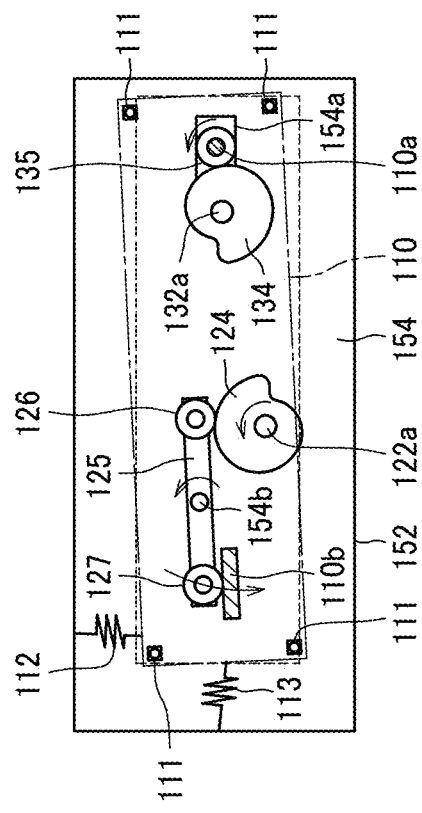

In order to clearly illustrate the motion of correction of the lateral displacement of the sheet P and the motion of correction of the angular displacement of the sheet P, FIG. 15B illustrates the motion of the pair of sheet gripping rollers 32 in correction of lateral displacement of the sheet P and FIG. 15C illustrates the motion of the pair of sheet gripping rollers 32 in correction of angular displacement of the sheet P. In the actual operation, as illustrated in FIG. 15D, the correction of angular displacement of the sheet P and the correction of lateral displacement of the sheet are performed in combination.

FIGS. 15A and 15B depict the correction operation on the sheet P to correct the lateral displacement of the sheet P in the width direction, along the order of flow of the correction operation from FIG. 15A to FIG. 15B. In other words, as the second motor 130 is driven to rotate the shift cam 134, the roller holding member 110 slides to the right side of FIG. 15B, against the spring force of the second tension spring 113 by movement of the shift cam 134. At this time, the cam follower 135 moves along the outer circumference of the shift cam 134 while rotating. Accordingly, the moving load of the roller holding member 110 that acts on the second motor 130 for correction of positional deviation in the width direction of the sheet P (correction of lateral displacement of the sheet P) is reduced.

Further, the roller 127 of the lever 125 rotates on the surface of the rotation receiver 110b while receiving the force of the first tension spring 112. Therefore, the roller holding member 110 slides smoothly. In other words, since the roller 127 does not receive any friction load due to the shift of the roller holding member 110 in the width direction, the roller holding member 110 rotates and shifts smoothly. Note that, while the first rotation cam 124 is stopped, the rotation receiver 110b is also stopped in the sheet conveyance direction. As a result, no correction of angular displacement of the sheet P is performed.

FIGS. 15A and 15C depict the correction operation on the sheet P to correct the angular displacement of the sheet P, along the order of flow of the correction operation from FIG. 15A to FIG. 15C. That is, as the first motor 120 is driven to rotate the first rotation cam 124, the lever 125 is pressed by the first rotation cam 124 to rotate in the counterclockwise direction about the support shaft 154b.

As a result, the roller holding member 110 is pressed by the roller 127 of the lever 125 at the position of the rotation receiver 110b, so as to rotate in the counterclockwise direction about the support shaft 110a at the right end, against the spring force of the first tension spring 112. At this time, the cam follower 126 and the cam follower 135 move along the outer circumference of the first rotation cam 124 and the outer circumference of the shift cam 134, respectively, while rotating. Accordingly, the moving load of the roller holding member 110 to act on the first motor 120 for correction of angular displacement of the sheet P is reduced.

FIGS. 15A and 15D depict the correction operation on the sheet P to correct the angular displacement of the sheet P and the lateral displacement of the sheet P are performed in combination, along the order of flow of the correction operation from FIG. 15A to FIG. 15D. That is, as the first motor 120 is driven to rotate the first rotation cam 124 and the second motor 130 is driven to rotate the shift cam 134, the roller holding member 110 performs the operation in combination of the correction of lateral displacement of the sheet P as illustrated in FIG. 15B and the correction of angular displacement of the sheet Pas illustrated in FIG. 15C.

As described above, the configuration according to the present embodiment includes the roller holding member 110 that is movable in the width direction of the sheet conveyance passage of the sheet P and is rotatable about the support shaft 110a, with the pair of sheet gripping rollers 32 held by the roller holding member 110. With this configuration, the rotation driving force of the rotation variable roller drive motor 140 on the fixed side of the roller holding member 110 is transmitted to the pair of sheet gripping rollers 32 via the two-step spline coupling 143. According to this configuration, the rotation variable roller drive motor 140 and the second motor 130 for correction of positional deviation in the width direction (for correction of the lateral displacement of the sheet P) is disposed on the fixed side of the roller holding member 110. Therefore, the weight of the device above the roller holding member 110 is reduced, thereby enhancing the responsiveness of correction of angular displacement of the sheet P.

Now, a detailed description of the correction of lateral displacement and the correction of angular displacement described above is given, with reference to FIG. 16.

Figure 16:
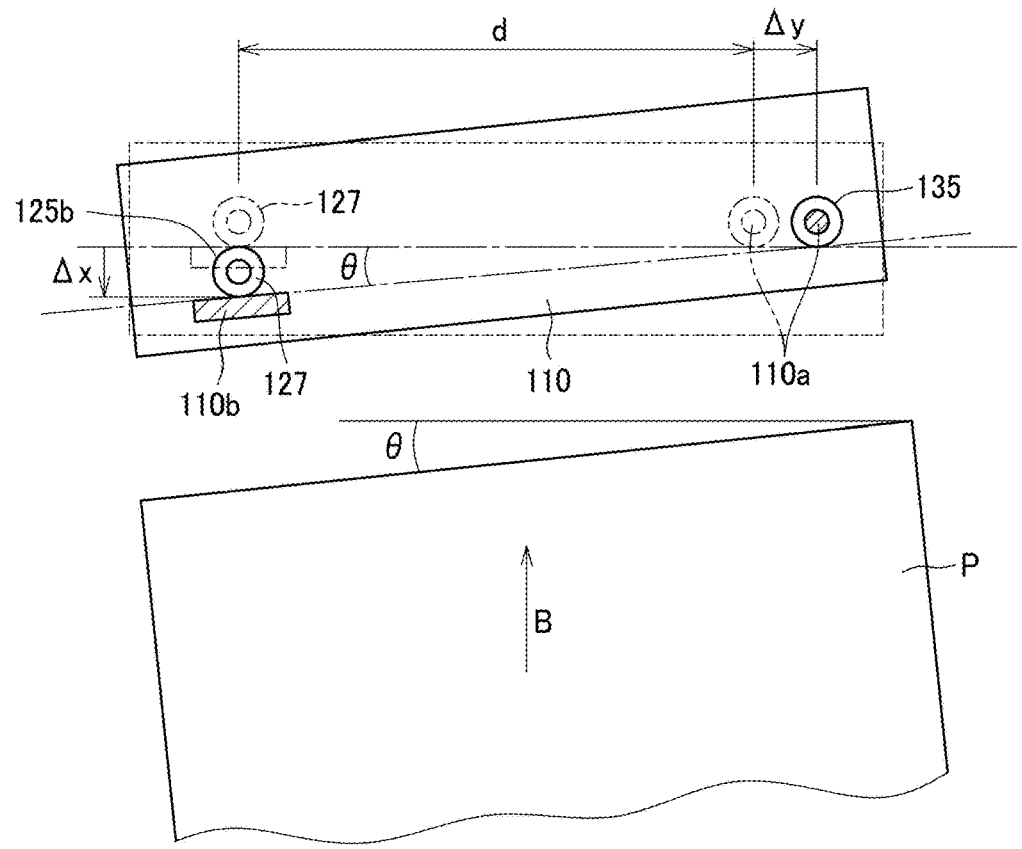
FIG. 16 is a diagram illustrating a lateral displacement amount $\Delta y$ of the roller holding member in the width and an angular displacement amount $\Delta x$ of the roller holding member in the direction along a plane of sheet conveyance of the sheet.

FIG. 16 is a diagram illustrating a lateral displacement amount Δy of the roller holding member 110 in the width direction and an angular displacement amount Δx of the roller holding member 110 along the plane of sheet conveyance of the sheet P.

In the correction of lateral displacement of the sheet P and the correction of angular displacement of the sheet P, as illustrated in FIG. 16, (1) the angular displacement amount of the sheet P is represented as "θ", (2) the lateral displacement amount (correction amount) of the sheet P is represented as "Δy", and (3) a distance between the home position in the width direction of the sheet P (i.e., the initial position of the support shaft 110a that functions as a guide target portion) and the center of the support shaft 125b of the roller 127 that functions as a first pressing portion of the first drive portion is represented as "d". Note that the lateral displacement amount Δy extends from the position to the right side of FIG. 16 that indicates a plus amount and from the position to the left side of FIG. 16 that indicates a minus amount. Further, arrow B in FIG. 16 indicates the sheet conveyance direction.

In this case, a forward and backward distance of the rotation receiver 110b that moves in the forward and backward direction by the roller 127 is represented as "Δx". Based on a result obtained by calculation with the following equation, Equation 2, the controller controls the first motor 120 for the correction of angular displacement as the first drive portion.

$$\Delta x = (d + \Delta y) \tan \theta \qquad \text{Equation 2}$$

In Equation 2, Δx is obtained by not multiplying tan θ by "d" but by multiplying tan θ by (d+Δy). Specifically, as described above, it is rare to perform the motion of correction of lateral displacement of the sheet as illustrated in FIG. 15B and the motion of FIG. 15 of angular displacement of FIG. 15C separately. Therefore, the combination of the motion of angular displacement of the sheet P and the motion of lateral displacement of the sheet P, as illustrated in FIG. 15D, is usually performed.

Due to the above-described reasons, in a case in which the roller holding member 110 is rotated (to perform the pick-up operation) by ignoring the above-described Δy and applying Δx that is obtained by Equation 3 described below, the pick-up operation is performed by the roller holding member 110 with an excess or insufficient of movement of the roller holding member 110. That is, errors occur in correction of angular displacement of the sheet associated with correction of lateral displacement of the sheet.

For example, in a case in which the support shaft 110a is shifted to the right by Δy for the correction of lateral displacement, as illustrated in FIG. 16, when this shift of the support shaft 110a is ignored and the first motor 120 for the correction of angular displacement is driven to move the rotation receiver 110b by Δx, the angular displacement amount of the sheet P is not fully corrected. That is, since the controller calculates to obtain Δx using Equation 3 described below, when the amount of movement of the support shaft 110a in the pick-up operation is too small, the amount of movement of the support shaft 110a in the adjustment operation is the same as the amount in the pick-up operation. As a result, angular displacement amount of the sheet P is not corrected sufficiently.

$$\Delta x = d^* \tan \theta \qquad \text{Equation 3}$$

By contrast, in a case in which the support shaft 110a is shifted to the opposite direction, i.e., the left by Δy for the correction of lateral displacement of the sheet P in FIG. 16, when this shift of the support shaft 110a is ignored and the first motor 120 for the correction of angular displacement of the sheet P is driven to move the rotation receiver 110b by Δx, the angular displacement amount of the sheet P is corrected by the excess amount. That is, since the amount of movement of the support shaft 110a in the pick-up operation is too great, when the amount of movement of the support shaft 110a in the adjustment operation is the same as the amount in the pick-up operation, the angular displacement amount of the sheet P is corrected by the excess amount. Due to the above-described reasons, in the present embodiment of the present disclosure, the first motor 120 for correction of angular displacement is controlled based on the result obtained using. Equation 2.

The above-described embodiments are illustrative and do not limit the present disclosure. It is therefore to be understood that within the scope of the appended claims, numerous additional modifications and variations are possible to this disclosure otherwise than as specifically described herein.

The image forming apparatus according to the embodiments of the present disclosure is not limited to the color image forming apparatus as illustrated in FIG. 1. Alternatively, the image forming apparatus may be a monochrome image forming apparatus that forms monochrome images on recording media. The image forming apparatus may be, e.g., a copier, a printer, a scanner, a facsimile machine, or a multifunction peripheral (MFP) having at least two of copying, printing, scanning, and facsimile functions. Further, the image forming apparatus according to the present disclosure is not limited to an electrophotographic image forming apparatus and may be applied to a liquid applying apparatus that discharges liquid onto a sheet that is being conveyed.

For example, the sheet conveying device according to the present disclosure is applicable to an inkjet image forming apparatus, as a liquid discharge device incorporated in the inkjet image forming apparatus. The sheet conveying device according to the present disclosure is also applicable to a post-processing apparatus that performs a post-processing operation on a sheet on which an image is formed. Next, a description is given of an inkjet image forming apparatus, with reference to FIG. 17, and a post-processing apparatus, with reference to FIG. 18.

Figure 17:
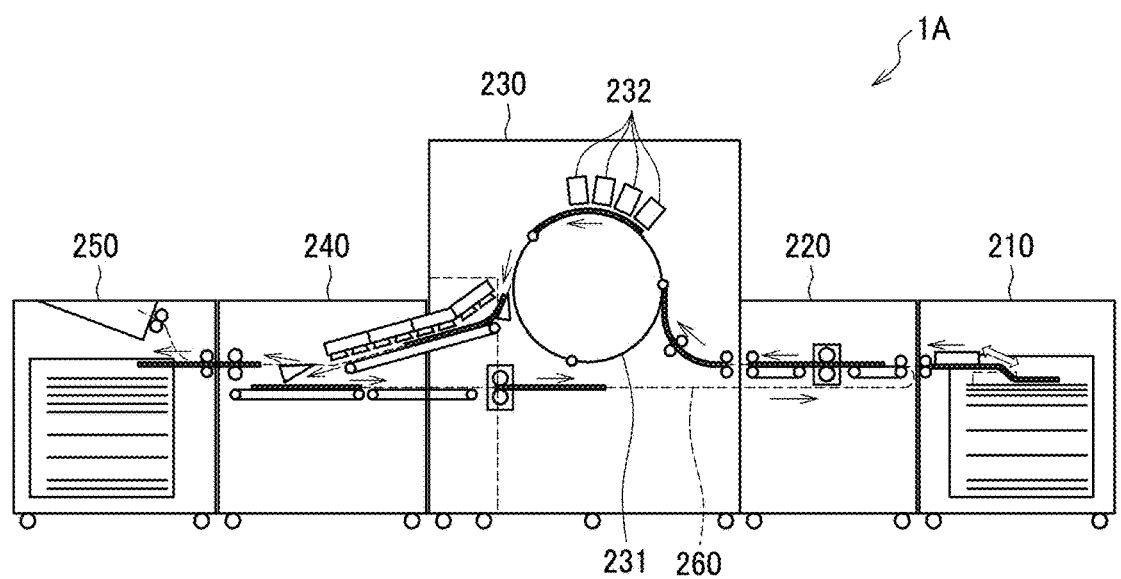
FIG. 17 is a diagram illustrating a schematic configuration of an image forming apparatus according to another embodiment of the present disclosure.

FIG. 17 is a diagram illustrating a schematic configuration of an inkjet image forming apparatus 1A according to another embodiment of the present disclosure.

As illustrated in FIG. 17, the inkjet image forming apparatus 1A includes a sheet feeding device 210, a sheet conveying device 220, an image forming device 230, a drying device 240, and a sheet ejecting device 250.

The sheet P fed from the sheet feeding device 210 is conveyed by the sheet conveying device 220 to the image forming device 230, in a state in which the positional deviation in the width direction (lateral displacement) of the sheet P and skew (angular displacement) of the sheet P are corrected, as in the above-described embodiment.

In the image forming device 230, the sheet P is positioned to a cylindrical drum 231. Then, along with rotation of the cylindrical drum 231, the sheet P is conveyed in a direction indicated by arrow in FIG. 17. Then, the sheet P is conveyed to a position below ink discharging heads 232 of respective colors (i.e., image forming position to the sheet P) at respective predetermined timings. Then, ink of each color is discharged onto the sheet P, so that an image is formed on the surface of the sheet P.

The sheet P having the image formed by the image forming device 230 is conveyed to the drying device 240 in which moisture in the ink on the surface of the sheet P is evaporated. Then, the sheet P is ejected to the sheet ejecting device 250 on which the sheet P is easily picked up by a user.

When the duplex printing is performed on the sheet P, after being dried in the drying device 240, the sheet P passes a sheet reversal passage 260 to be conveyed again to the sheet conveying device 220 while the sheet P is reversed with the front face down. According to the series of operations, when forming an image on the back face of the sheet P, the image is formed on the sheet P at the image forming position of the image forming device 230 (i.e., the facing position of the cylindrical drum 231 and each of the ink discharging heads 232 of the respective colors) in a state in which the positional deviation of the sheet P is corrected. After moisture in the ink on the surface of the sheet P is evaporated in the drying device 240, the sheet P is ejected to the sheet ejecting device 250 on which the sheet P is easily picked up by a user.

Figure 18:
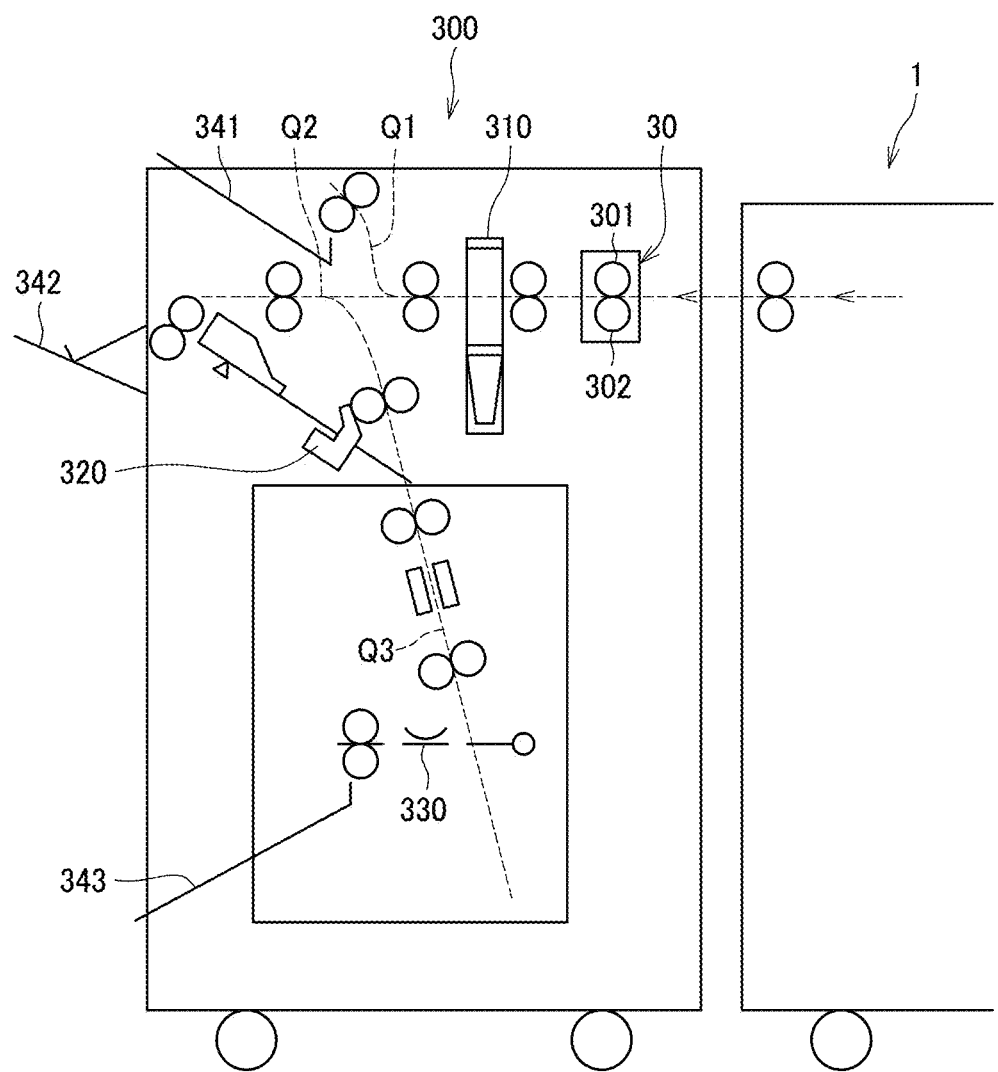
FIG. 18 is a diagram illustrating a schematic configuration of a post-processing apparatus.

Now, a description is given of the post-processing apparatus 300 to which the present disclosure is applied, with reference to FIG. 18.

FIG. 18 is a diagram illustrating a schematic configuration of the post-processing apparatus 300.

The post-processing apparatus 300 illustrated in FIG. 18 includes a punching device 310, a stapling device 320, a sheet folding device 330, and multiple sheet trays (sheet stackers), which are a first sheet tray 341, a second sheet tray 342 and a third sheet tray 343. The punching device 310 performs a punching process to punch or open holes on a sheet P. The stapling device 320 performs a stapling process (binding process) on a sheet bundle including a sheet P. The sheet folding device 330 performs a center folding process on a sheet P. The post-processing apparatus 300 has three sheet conveyance passages, which are a first sheet conveyance passage Q1, a second sheet conveyance passage Q2 and a third sheet conveyance passage Q3, to perform different post processing operations. After being fed from the image forming apparatus the sheet P is conveyed to a selected one of the three sheet conveyance passages Q1, Q2, and Q3.

The first sheet conveyance passage Q1 is a sheet conveyance passage to convey the sheet to the first sheet tray 341 regardless of whether the punching process has been performed on the sheet P by the punching device 310. The second sheet conveyance passage Q2 is a sheet conveyance passage to convey the sheets P (sheet bundle) to the second sheet tray 342 after the stapling process is performed on the sheets P (sheet bundle) by the stapling device 320. The third sheet conveyance passage Q3 is a sheet conveyance passage to convey the sheet P to the third sheet tray 343 after the center folding process is performed on the sheet P by the sheet folding device 330.

After the sheet P is fed from the image forming apparatus 1 to the post-processing apparatus 300, the sheet P is conveyed to a registration facing roller 301 and a registration roller 302, each being disposed upstream from the punching device 310 in the sheet conveying direction. Then, the registration facing roller 301 and the registration roller 302 perform corrections of angular displacement of the sheet P and correction of positional deviation in the width direction, on the sheet P, which is similar to the above-described corrections. According to this configuration, the accuracy of punching process, binding process, and center folding process, each being performed in the post-processing apparatus 300 is enhanced.

However, the term "sheet" conveyed by the sheet conveying device according to the present disclosure includes, for example, plain paper, coated paper, label paper, overhead projector (OHP) transparency sheet and film, per, and cloth. Further, the term "sheet" includes, for example, a resin sheet, a protective paper on the front and back faces, a metal sheet, an electronic circuit board material subject to metal foil plating such as a copper foil or electroplating, a special film, a plastic film, a prepreg, and an electronic circuit substrate sheet. The prepreg is a sheet-like material in which, for example, carbon fiber is previously impregnated with resin. As an example, the prepreg includes a sheet-like reinforced plastic molding material that is manufactured by, for example, impregnating a thermosetting resin, into which additives such as curative agent and coloring agent are mixed, in a fibrous reinforcing material such as a carbon fiber or a glass cloth, and then heating or drying to a semi-cured state.

Further, the term "image forming apparatus" including the sheet conveying device refers to an image forming apparatus that performs image formation by attaching developer or ink to a medium such as paper, OHP sheet, yarn, fiber, cloth, leather, metal, plastic, glass, wood, or ceramics. In addition, note that the term "image forming apparatus" indicates an action for providing (i.e., printing) not only an image having meanings such as texts and figures on a recording medium but also an image having no meaning such as patterns on a recording medium.

The present disclosure is not limited to specific embodiments described above, and numerous additional modifications and variations are possible in light of the teachings within the technical scope of the appended claims. It is therefore to be understood that, the disclosure of this patent specification may be practiced otherwise than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet conveying device comprising:
a corrector configured to correct a position of a sheet; and
at least three detectors disposed in a sheet conveyance direction,
each of the at least three detectors being configured to detect a lateral end of the sheet according to a length of the sheet to be conveyed in the sheet conveyance direction,
the corrector being configured to correct the position of the sheet based on detection results of the at least three detectors;
wherein the at least three detectors include:
an upstream detector disposed upstream from the corrector in the sheet conveyance direction;
a first downstream detector disposed downstream from the corrector in the sheet conveyance direction; and a second downstream detector disposed downstream from the corrector and the first downstream detector in the sheet conveyance direction, wherein, when the sheet to be conveyed is relatively long in the sheet conveyance direction, the upstream detector and the second downstream detector detect the sheet and the corrector corrects the position of the sheet based on detection results of the upstream detector and the second downstream detector, and wherein, when the sheet to be conveyed is relatively short in the sheet conveyance direction, the first downstream detector and the second downstream detector detect the sheet and the corrector corrects the position of the sheet based on detection results of the first downstream detector and the second downstream detector.

2. The sheet conveying device according to claim 1, wherein the second downstream detector is disposed extreme downstream of the at least three detectors in the sheet conveyance direction, wherein at least the second downstream detector is configured to detect the sheet regardless of a size of the sheet to be conveyed, and wherein the corrector is configured to correct the position of the sheet based on detection results including a detection result of the second downstream detector.

3. The sheet conveying device according to claim 1, further comprising another upstream detector disposed upstream from the upstream detector in the sheet conveyance direction, wherein said another upstream detector is configured to detect a lateral end of the sheet, wherein the upstream detector and said another upstream detector are configured to detect the sheet and the corrector is configured to correct the position of the sheet based on detection results of the upstream detector and said another upstream detector, wherein, when the sheet to be conveyed is relatively long in the sheet conveyance direction, the upstream detector and the second downstream detector detect the sheet and the corrector corrects the position of the sheet again based on detection results of the upstream detector and the second downstream detector, and wherein, when the sheet to be conveyed is relatively short in the sheet conveyance direction, the first downstream detector and the second downstream detector detect the sheet and the corrector corrects the position of the sheet again based on detection results of the first downstream detector and the second downstream detector.

4. An image forming apparatus comprising:

an image forming device configured to from an image on a sheet; and the sheet conveying device according to claim 1.

5. The image forming apparatus according to claim 4, wherein the second downstream detector is disposed extreme downstream of the at least three detectors in the sheet conveyance direction and upstream, in the sheet conveyance direction, from an image forming position at which the image forming device forms an image on the sheet.

* * * * *